(12) United States Patent
Uchiyama et al.

(10) Patent No.: US 12,217,528 B2
(45) Date of Patent: Feb. 4, 2025

(54) IMAGE PROCESSING APPARATUS FOR DETERMINING AN OBJECT AREA WHERE PART OF THE OBJECT IS OCCLUDED

(71) Applicant: CANON KABUSHIKI KAISHA, Tokyo (JP)

(72) Inventors: Hiroyuki Uchiyama, Kanagawa (JP); Hiroshi Tojo, Tokyo (JP); Shinji Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 17/695,622

(22) Filed: Mar. 15, 2022

(65) Prior Publication Data

US 2022/0207904 A1  Jun. 30, 2022

Related U.S. Application Data

(63) Continuation of application No. PCT/JP2020/034093, filed on Sep. 9, 2020.

(30) Foreign Application Priority Data

Sep. 20, 2019 (JP) .................. 2019-172191
Sep. 20, 2019 (JP) .................. 2019-172192

(51) Int. Cl.
*G06V 40/10* (2022.01)
*G06T 7/73* (2017.01)
(Continued)

(52) U.S. Cl.
CPC .............. *G06V 40/103* (2022.01); *G06T 7/73* (2017.01); *G06V 10/25* (2022.01); *G06V 10/40* (2022.01);
(Continued)

(58) Field of Classification Search
None
See application file for complete search history.

(56) References Cited

U.S. PATENT DOCUMENTS 8,913,782 B2 * 12/2014 Yashiro ................ G06V 40/167
382/118
2007/0098231 A1 * 5/2007 Minato .................. G06V 20/46
382/118
(Continued)

FOREIGN PATENT DOCUMENTS

JP  2004005384 A  1/2004
JP  2010165052 A  7/2010
(Continued)

OTHER PUBLICATIONS

Liming Zhao, et al., Deeply-Learned Part-Aligned Representations for Person Re-Identification, 2017 IEEE International Conference on Computer Vision (ICCV).

*Primary Examiner* — Dung D Tran
(74) *Attorney, Agent, or Firm* — Canon U.S.A., Inc. IP Division

(57) ABSTRACT

An image processing apparatus includes a first detection unit configured to detect, from an image in which an object including a plurality of parts is captured, first feature points corresponding to the parts of the object, an acquisition unit configured to acquire a reliability indicating a likelihood that a position indicated by a feature point is a part corresponding to the feature point for each of the first feature points detected by the first detection unit, a second detection unit configured to detect a second feature point based on some of the first feature points for a part corresponding to a first feature point with the low reliability, and a determination unit configured to determine an area including the object based on some of the first feature points and the second feature point.

20 Claims, 18 Drawing Sheets

(51) Int. Cl.
*G06V 10/25* (2022.01)
*G06V 10/40* (2022.01)
*G06V 10/75* (2022.01)
*G06V 10/98* (2022.01)

(52) U.S. Cl.
CPC ............ *G06V 10/751* (2022.01); *G06V 10/98* (2022.01); *G06T 2207/20076* (2013.01); *G06T 2207/20081* (2013.01); *G06T 2207/30196* (2013.01)

(56) References Cited

U.S. PATENT DOCUMENTS

| | | | | |
|---|---|---|---|---|
| 2013/0070973 | A1* | 3/2013 | Saito | G06V 10/993 |
| | | | | 382/118 |
| 2013/0243274 | A1* | 9/2013 | Sukegawa | G06V 40/16 |
| | | | | 382/118 |
| 2017/0011523 | A1* | 1/2017 | Magai | G06F 18/217 |
| 2020/0034981 | A1* | 1/2020 | Torama | H04N 5/33 |

FOREIGN PATENT DOCUMENTS

| | | |
|---|---|---|
| JP | 2014178862 A | 9/2014 |
| JP | 2014197386 A | 10/2014 |

* cited by examiner

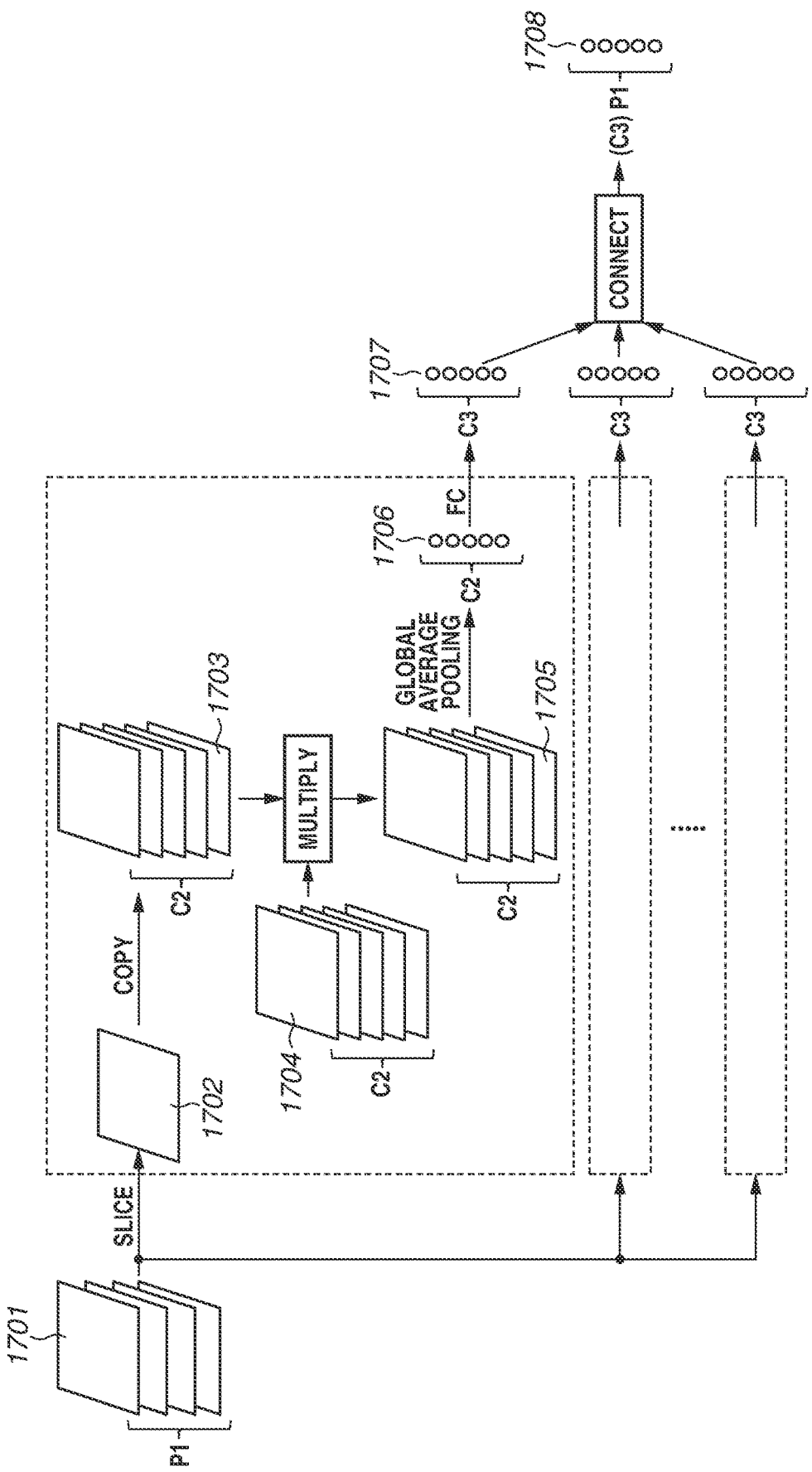

IMAGE PROCESSING APPARATUS FOR DETERMINING AN OBJECT AREA WHERE PART OF THE OBJECT IS OCCLUDED

CROSS-REFERENCE TO RELATED APPLICATIONS

This application is a Continuation of International Patent Application No. PCT/JP2020/034093, filed Sep. 9, 2020, which claims the benefit of Japanese Patent Applications No. 2019-172191, filed Sep. 20, 2019, and No. 2019-172192, filed Sep. 20, 2019, all of which are hereby incorporated by reference herein in their entirety.

BACKGROUND OF THE INVENTION

Field of the Invention

The present invention relates to detection of a person in an image.

Background Art

A technique for a monitoring camera system in which an object, such as a person, is detected from a camera image to determine whether the object is identical to an object detected by another camera is known. If an object to be identified is a person, the object is first detected from a camera image. Next, a re-identification feature indicating a feature specific to the object is extracted from an area of the object. The extracted re-identification feature is compared with a re-identification feature of an object detected by another camera, and whether the objects are the same object is determined. Japanese Patent Application Laid-Open No. 2014-197386 discusses a method for extracting feature points of an object to determine an object area from a circumscribed rectangle drawn around a feature point group.

CITATION LIST

Patent Literature

PTL 1: Japanese Patent Application Laid-Open No. 2014-197386

A phenomenon called "occlusion" in which a part of a subject is occluded by another object is known as a cause of deterioration in the accuracy of determination of an object area, image processing, and image recognition. In the case of detecting a feature point, an image feature of a subject cannot be accurately extracted from an occluded peripheral area, which makes it difficult to accurately estimate the feature point. In the case of extracting a re-identification feature for person re-identification, information for identifying a person cannot be accurately extracted from an occluded peripheral area in such cases, an object area cannot be determined by the method discussed in Japanese Patent Application Laid-Open No. 2014-197386. The present invention has been made in view of the above-described issue and is directed to determining an object area even in a situation where part of the object is occluded.

SUMMARY OF THE INVENTION

According to another aspect of the present invention, an image processing apparatus includes a first detection unit configured to detect, from an image in which an object including a plurality of parts is captured, first feature points corresponding to the parts of the object, an acquisition unit configured to acquire a reliability indicating a likelihood that a position indicated by a feature point is a part corresponding to the feature point for each of the first feature points detected by the first detection unit, a second detection unit configured to detect a second feature point based on some of the first feature points for a part compounding to a first feature point with the low reliability, and a determination unit configured to determine an area including the object based on some of the first feature points and the second feature point.

Further features of the present invention will become apparent from the following description of exemplary embodiments with reference to the attached drawings.

BRIEF DESCRIPTION OF THE DRAWINGS

The accompanying drawings, which are incorporated in and constitute part of the specification, illustrate exemplary embodiments of the present invention, and together with the description, serve to explain the principles of the present invention.

FIG. 17 illustrates a configuration example of an image integration subnetwork.

DESCRIPTION OF THE EMBODIMENTS

Exemplary embodiments of the present invention will be described below.

First Exemplary Embodiment

Figure 3:
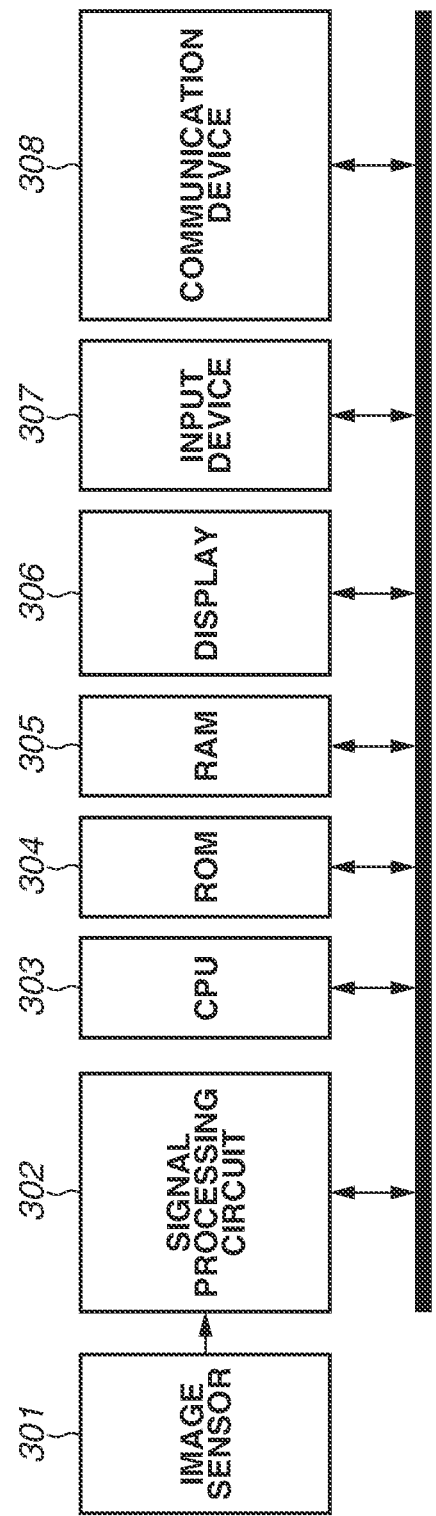
FIG. 3 is a block diagram illustrating a hardware configuration example.

FIG. 3 illustrates a hardware configuration example according to a first exemplary embodiment. As illustrated in FIG. 3, an image sensor (image capturing unit) 301 is composed of a charge-coupled device (CCD) sensor, a complementary metal-oxide semiconductor (CMOS) sensor, or the like, and converts an optical subject image into an electric signal. A signal processing circuit 302 processes a time series signal with regard to the subject image obtained from the image sensor 301 and converts the signal into a digital signal. The image sensor 301 and the signal processing circuit 302 each serve as a camera and are each connected to a bus. A central processing unit (CPU) 303 executes a control program stored in a read-only memory (ROM) 304, thereby controlling an entire apparatus. The ROM 304 stores the control program to be executed by the CPU 303 and various parameter data. The control program is executed by the CPU 303, so that the apparatus is caused to function as various units for executing processes in flowcharts to be described below. A random-access memory (RAM) 305 stores an image and various information. The RAM 305 functions as a work area for the CPU 303 and an area for temporarily saving data. FIG. 3 also illustrates a display 306. An input device 307 is, for example, a pointing device such as a mouse, or a keyboard, and receives an input from a user. A communication device 308 is, for example, a network or a bus, and communicates data and a control signal with another communication device. In the present exemplary embodiment, processes corresponding to steps in the flowcharts to be described below are implemented by software using the CPU 303, but instead some or all of the processes may be implemented by hardware such as an electronic circuit. An image display apparatus according to the present invention may be implemented using a general-purpose personal computer (PC) without using the image sensor 301 and the signal processing circuit 302, or may be implemented as a dedicated apparatus. Further, software (program) acquired via a network or various storage media may be executed by a processing unit (e.g., a CPU, or a processor) of a PC or the like.

Prior to description of exemplary embodiments, terms used herein will be described. The term "feature point" refers to a point associated with a unit of an object composed of a plurality of parts. Specifically, in the following description, a feature point indicates a position (two-dimensional coordinates) of a joint of a person in an image. The term "reliability" is calculated for each detected feature point and is indicated by a real number in a range from 0 to 1 that represents a likelihood that a part corresponding to the feature point is present in the image. For example, in the case of detecting the position of the head of a person as a feature point, if the head of the person is clearly captured in the image, the reliability of the feature point corresponding to the head is high. On the contrary, if the head of the person is blurred or occluded by another object, the reliability of the feature point corresponding to the head is low. In other words, the reliability indicates a likelihood that the position indicated by the feature point is identical to the part corresponding to the feature point. The present exemplary embodiment describes an example where an object to be monitored is a person. However, the object to be monitored is not limited to a person, and may be another object such as an animal or a vehicle. In other words, any object can be applied as long as the object is a structure composed of a plurality of parts. In the present exemplary embodiment, a person is identified using a feature amount of the whole body of the person. Alternatively, a person may be identified using the face of the person. In this case, the person identification is particularly known as "face authentication", "face re-identification", "face search", or the like.

Figure 1:
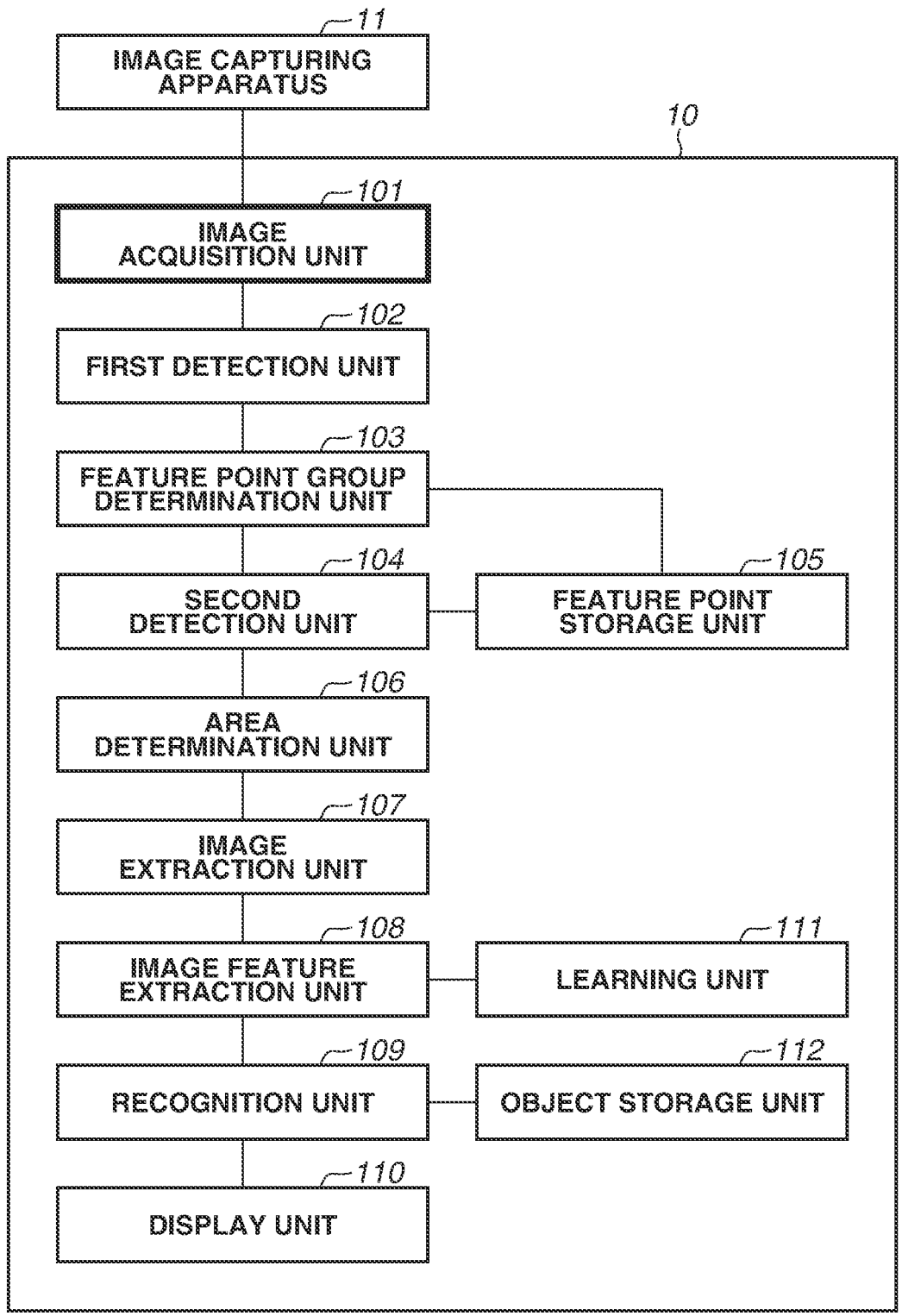
FIG. 1 is a block diagram illustrating a functional configuration example of an image display apparatus according to an exemplary embodiment.

FIG. 1 illustrates a configuration according to the present exemplary embodiment. The configuration according to the present exemplary embodiment includes an image acquisition unit 101, a first detection unit 102, a feature point group determination unit 103, a second detection unit 104, a feature point storage unit 105, an area determination unit 106, an image extraction unit 107, an image feature extraction unit 108, a recognition unit 109, a display unit 110, a learning unit 111, and an object storage unit 112.

The image acquisition unit 101 acquires, from the camera, an image frame in which an object including a plurality of parts is captured. The first detection unit 102 detects a position of each feature point of the object and a reliability of the feature point from the image frame. A method for detecting a position of each joint of a person in an image and a reliability of the position will be described below. The feature point group determination unit 103 determines a feature point group for detecting a feature point whose reliability is lower than a predetermined value based on the position of the feature point detected by the first detection unit 102 and the reliability of the feature point. Combinations of feature points are prepared in advance, and any one of the combinations to be used is determined depending on conditions for the reliability of each feature point. A specific determination method will be described below. If the reliability of a predetermined feature point among the feature points detected by the first detection unit 102 is lower than the predetermined value, the second detection unit 101 detects the predetermined feature point from the image by a method different from a first detection method. Each feature point is detected using a relative positional relationship between feature points. A specific detection method will be described below. The feature point storage unit 105 stores the detected feature points. The area determination unit 106 determines an area including an object based on the feature points. An area including an object to be a target of image feature extraction is determined using a combination of specific feature points determined in advance from among the detected feature points. The image extraction unit 107 clips the area determined by the area determination unit 106 from the image frame. The image feature extraction unit 108 extracts an image feature for identifying the person using a neural network or the like from a clipped partial image. The recognition unit 109 performs image recognition using the extracted image feature. In the present exemplary embodiment, the image recognition is performed for person identification. Specifically, extracted image features are compared to thereby determine whether a feature amount indicates the same person. The method will be described in detail below. The display unit 110 displays an image recognition result on a screen. The learning unit 111 learns a neural network or the like used for image feature extraction in the image feature extraction unit 108. The object storage unit 112 stores information about an object used by the recognition unit 109.

Figure 2:
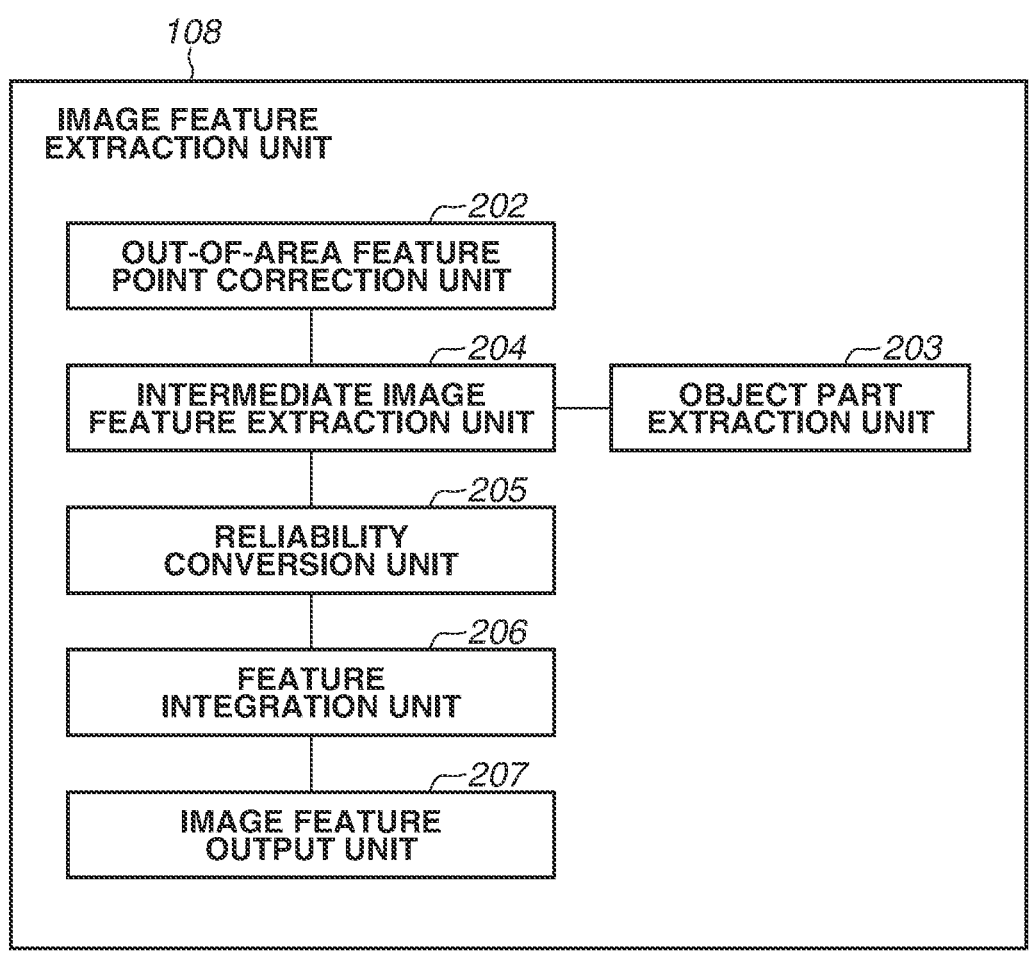
FIG. 2 is a block diagram illustrating a functional configuration example of an image feature determination unit.

FIG. 2 illustrates a configuration example of the image feature extraction unit 108 illustrated in FIG. 1. The image feature extraction unit 108 includes an out-of-area feature point correction unit 202, an object part extraction unit 203, an intermediate image feature extraction unit 201, a reliability conversion unit 205, a feature integration unit 206, and an image feature output unit 207.

The out-of-area feature point correction unit 202 corrects a feature point outside a partial image area among the feature points extracted by the first detection unit 102 illustrated in FIG. 1. The object part extraction unit 203 extracts parts of the object from the image. The intermediate image feature extraction unit 204 extracts an intermediate image feature from the image and the parts of the object. The reliability conversion unit 205 applies conversion processing to the reliability of each feature point extracted by the first detection unit 102. The feature integration unit 206 integrates an output from the intermediate image feature extraction unit 204 with an output from the reliability conversion unit 205. The image feature output unit 207 generates an image feature based on an output from the feature integration unit 206.

Figure 4:
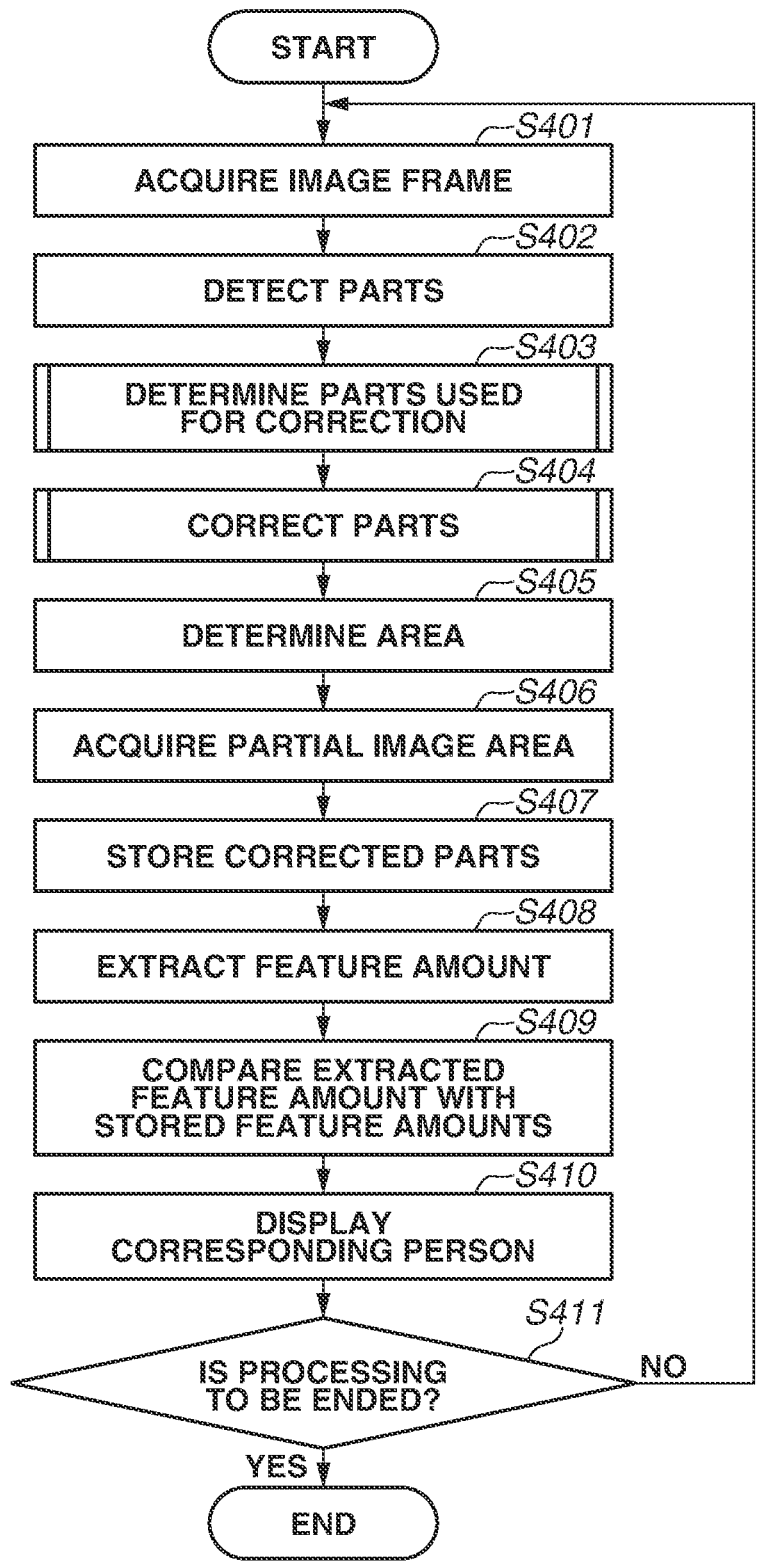
FIG. 4 is a flowchart illustrating a procedure of processing to be executed by an image processing apparatus according to an exemplary embodiment.

An operation of an image processing apparatus 10 according to the present exemplary embodiment will be described with reference to a flowchart illustrated in FIG. 4. Processing in the flowchart illustrated in FIG. 4 is executed based on a computer program stored in the ROM 304 by the CPU 303 being a computer, illustrated in FIG. 3.

In step S401, the image acquisition unit 101 acquires an image frame from the camera. This step corresponds to an operation of the image acquisition unit 101 illustrated in FIG. 1.

In step S402, a plurality of feature points associated with a plurality of parts of an object is detected from a captured image of the object including the plurality of parts in the image frame acquired in step S401 (first detection method). This step corresponds to an operation of the first detection unit 102 illustrated in FIG. 1. In step S402, the image frame is input, and a plurality of feature points of a person in the image and the reliability of each feature point are extracted. For each of the detected feature points, the reliability indicating a likelihood that the feature point is present in the image is acquired. If an image processing target is a person, a position of each joint of a human body can be used as a feature point. In this step, five feature points, namely, a head vertex, a neck, a waist, a right ankle, and a left ankle of a person are detected. In the detection of the feature points, convolutional pose machines are used (Shih-En Wei et al., "Convolutional Pose Machines," Institute of Electrical and Electronics Engineers (IEEE), 2016.). In this method, a reliability map indicating joint positions on the image is calculated using a trained model (neural network). The reliability map is a two-dimensional map. Where the number of joint points is represented by P, (P+1) maps are present (one map corresponds to a background). In a reliability map indicating a certain joint point, a position with a high reliability is regarded as a position where the joint point is present. The reliability is indicated by a real number in a range from 0 to 1 representing the likelihood that the feature point is present in the image. A real number closer to 1 indicates a higher reliability. A joint point occluded by another object is extracted from the object that is not a person, which leads to deterioration in the likelihood of being determined as a person's joint. Accordingly, the reliability of the position of the joint is lower than that of a joint that is not occluded by another object. On the other hand, the joint that is not occluded by another object can be favorably extracted from the person, and thus the reliability of the position of the joint is high.

Any method other than convolutional pose machines may be used as the method for detecting each feature point of an object and the reliability of the feature point. For example, a rule-based method may be used to identify each joint point using image features extracted with regard to joint points of a human body. Alternatively, an image feature of the head of a person may be extracted from an image, and the position of the body of the person may be estimated based on the position where the head is extracted. In the present exemplary embodiment, a joint point of a human body is used as a feature point. However, if the image processing target is a face, face feature points can be used. As the face feature points, a center point, an end point, or a point on a contour of each part such as an eye, an eyebrow, a nose, a mouse, or an ear, a point on a contour of an entire face shape, or the like can be used.

In step S403, the feature point group determination unit 103 determines a feature point group used for a second detection method. Step 5403 corresponds to an operation of the feature point group determination unit 103 illustrated in FIG. 1. The feature point group determined in step S403 is used in the second detection method. A plurality of patterns of combination is prepared as feature point groups, and a pattern of combination is selected from among the plurality of patterns of combination depending on conditions for the reliability of each feature point, thereby the feature point group to be used is determined. The feature point group is used in the second detection method in the subsequent step S404. The feature point group includes a feature point (head, neck, or waist in this case) used to determine a corrected position. In the present exemplary embodiment, feature points to be corrected as the predetermined feature point correspond to the waist, the right ankle, and the left ankle. The right ankle and the left ankle are corrected in the same procedure, and thus only the correction of the right ankle will be described below. One ankle to be processed is hereinafter simply referred to as an ankle.

The processing to be executed by the feature point group determination unit 103 in step S403 will be described with reference to a flowchart illustrated in FIG. 5. As described below, six types of feature point groups A1, A2, A3, B1, B2, and B3 are prepared in advance as candidates for feature point groups used for correction. One of the feature point groups A1, A2, and A3 for correction of the waist and one of the feature point groups B1, B2, and B3 for detection of the ankle in the second detection method are determined depending on conditions.

As described in detail below, the feature point group A1 is an empty set, and the detection result from the first detection unit 102 is adopted as it is. The position of the waist is detected based on the positions of the head and the neck in a current frame by using the feature point group A2. The position of the waist in the current frame is detected based on the positions of the head and the waist in a previous frame by using the feature point group A3. The feature point group B1 is an empty set, and the detection result from the first detection unit 102 is adopted as it is. The position of the ankle is detected based on the positions of the neck and the waist in the current frame by using the feature point group B2. The position of the ankle in the current frame is detected based on the positions of the neck and the ankle in the previous frame by using the feature point group B3.

Figure 5:
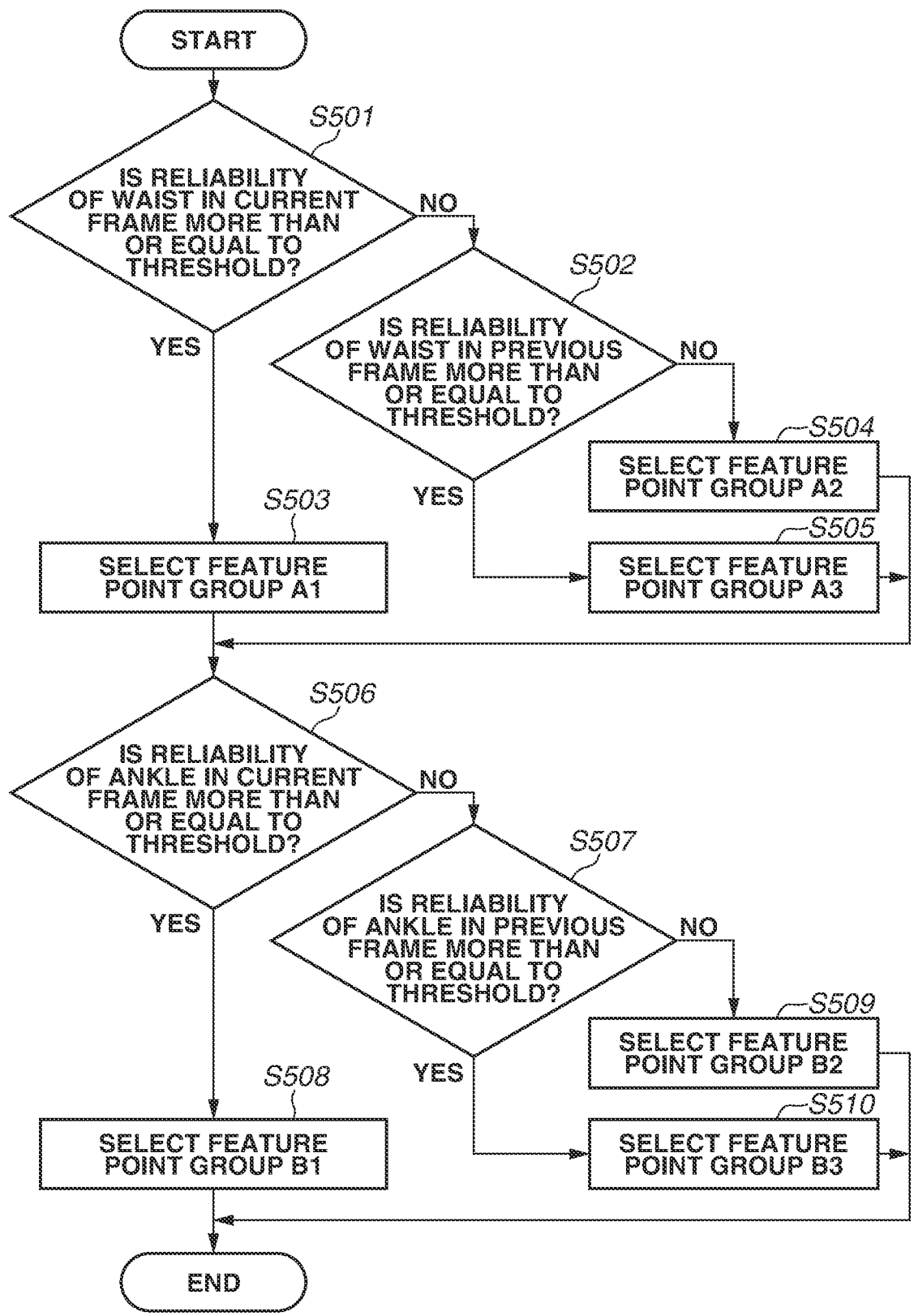
FIG. 5 is a flowchart illustrating a procedure of processing to be executed by the image processing apparatus.

In step S501 illustrated in FIG. 5, the feature point group determination unit 103 evaluates whether the reliability of the waist in the current frame determined in step S402 is more than or equal to a predetermined threshold. If the reliability is more than or equal to the threshold (YES in step S501), the processing proceeds to step S503. If the reliability is less than the threshold (NO in step S501), the processing proceeds to step S502.

In step S502, the feature point group determination unit 103 evaluates whether the reliability of the waist in the previous frame stored in the feature point storage unit 105 is more than or equal to a threshold. If the reliability is more than or equal to the threshold (YES in step S502), the processing proceeds to step S505. If the reliability is less than the threshold (NO in step S502), the processing proceeds to step S504. The previous frame is an image frame that is acquired in step S401 of a previous loop in the flowchart illustrated in FIG. 4. However, if no feature points in the previous frame are stored in the feature point storage unit 105, or if step S403 illustrated in FIG. 4 is executed for the first time, the processing proceeds to step S504.

In step S503, the feature point group determination unit 103 determines the feature point group A1 as the feature point group used in the second detection method, and then the processing proceeds to step S506. If the feature point group A1 is determined, the feature point corresponding to the waist in the current frame is reliable, and thus there is no need to detect the feature point corresponding to the waist again in the subsequent processing.

In step S504, the feature point group determination unit 103 determines the feature point group A2 as the feature point group used in the second detection method, and then the processing proceeds to step S506. If the feature point group A2 is determined, both the joint point of the waist in the current frame and the joint point of the waist in the previous frame are not reliable, and thus the position of the waist in the current frame is detected based on the positions of the head and the neck in the current frame in the subsequence processing.

In step S505, the feature point group determination unit 103 selects the feature point group A3 as the feature point group used for correction, and then the processing proceeds to step S506. If the feature point group A3 is selected, the feature point corresponding to the waist in the current frame is not reliable, but the feature point corresponding to the waist in the previous frame is reliable. Thus, the position of the waist in the current frame is corrected based on the positions of the head and the waist in the previous frame in the subsequent processing.

In step S506, the feature point group determination unit 103 evaluates whether the reliability of the ankle in the current frame determined in step S402 is more than or equal to a predetermined threshold. If the reliability is more than or equal to the threshold (YES in step S506), the processing proceeds to step S508. If the reliability is less than the threshold (NO in step S506), the processing proceeds to step S507, In step S507, the feature point group determination unit 103 evaluates whether the reliability of the ankle in the previous frame stored in the feature point storage unit 105 is more than or equal to a predetermined threshold. If the reliability is more than or equal to the threshold (YES in step S507), the processing proceeds to step S510. If the reliability is less than the threshold (NO in step S507), the processing proceeds to step S509. However, if no feature points in the previous frame are stored in the feature point storage unit 105, or if step S403 illustrated in FIG. 4 is executed for the first time, the processing proceeds to step S509.

In the present exemplary embodiment, the thresholds used in steps S501, S502, S506, and S507 are different values, but instead may be the same value.

In step S508, the feature point group determination unit 103 selects the feature point group B1 as the feature point group used for correction, and then the processing in the flowchart illustrated in FIG. 5 ends. If the feature point group B1 is selected, the feature point corresponding to the ankle in the current frame is reliable. Thus, there is no need to detect the position of the ankle in the subsequent processing.

In step S509, the feature point group determination unit 103 selects the feature point group B2 as the feature point group used for correction, and then the processing in the flowchart illustrated in FIG. 5 ends. If the feature point group B2 is selected, both the position of the ankle in the current frame and the position of the ankle in the previous frame are not reliable, and thus the position of the ankle in the current frame is detected based on the positions of the ankle and the waist in the current frame in the subsequent processing.

In step S510, the feature point group determination unit 103 selects the feature point group B3 as the feature point group used for correction, and then the processing in the flowchart illustrated in FIG. 5 ends. If the feature point group B3 is selected, the feature point corresponding to the ankle in the current frame is not reliable, but the feature point corresponding to the ankle in the previous frame is reliable. Thus, the position of the ankle in the current frame is detected based on the positions of the neck and the ankle in the previous frame in the subsequent processing.

In steps S506, S507, S508, S509, and S510 described above, only one of the ankles (right ankle) is described. However, the feature point group determination unit 103 determines the feature point group used in the second detection method also for the other ankle (left ankle) in the same manner. To detect the position of the ankle, it is desirable to estimate the position of the ankle based on a feature point that is the closest to the position of the ankle. Accordingly, if the position of the waist can be adopted (the reliability of the position of the waist is high), the position of the ankle is detected using the position of the waist. If the position of the waist is unknown (the reliability of the position of the waist is low), the position of the ankle is detected using the position of the neck that is the second closest to the position of the ankle after the position of the waist. A sequence of processes described below is based on the intended purpose described above, but the sequence may be changed. Further, the feature point group may be determined so that only the position of the ankle is detected without detecting the position of the waist.

In step S404 illustrated in FIG. 4, the second detection unit 104 detects a predetermined feature point by the second detection method using the feature point group determined in step S403. The processing of step S404 corresponds to an operation of the second detection unit 104 illustrated in FIG. 1. The operation of step S404 will be described with reference to a flowchart illustrated in FIG. 6. In the processing illustrated in FIG. 6, the second detection unit 104 detects the predetermined feature point (position of the ankle) based on the feature point groups A1, A2, A3, B1, B2, and B3 determined in the processing illustrated in the flowchart of FIG. 5.

As with step S403 illustrated in FIG. 4, the right ankle and the left ankle are corrected in the same procedure, and thus only the detection of the right ankle will be described below. One ankle to be processed is hereinafter simply referred to as an ankle.

Figure 6:
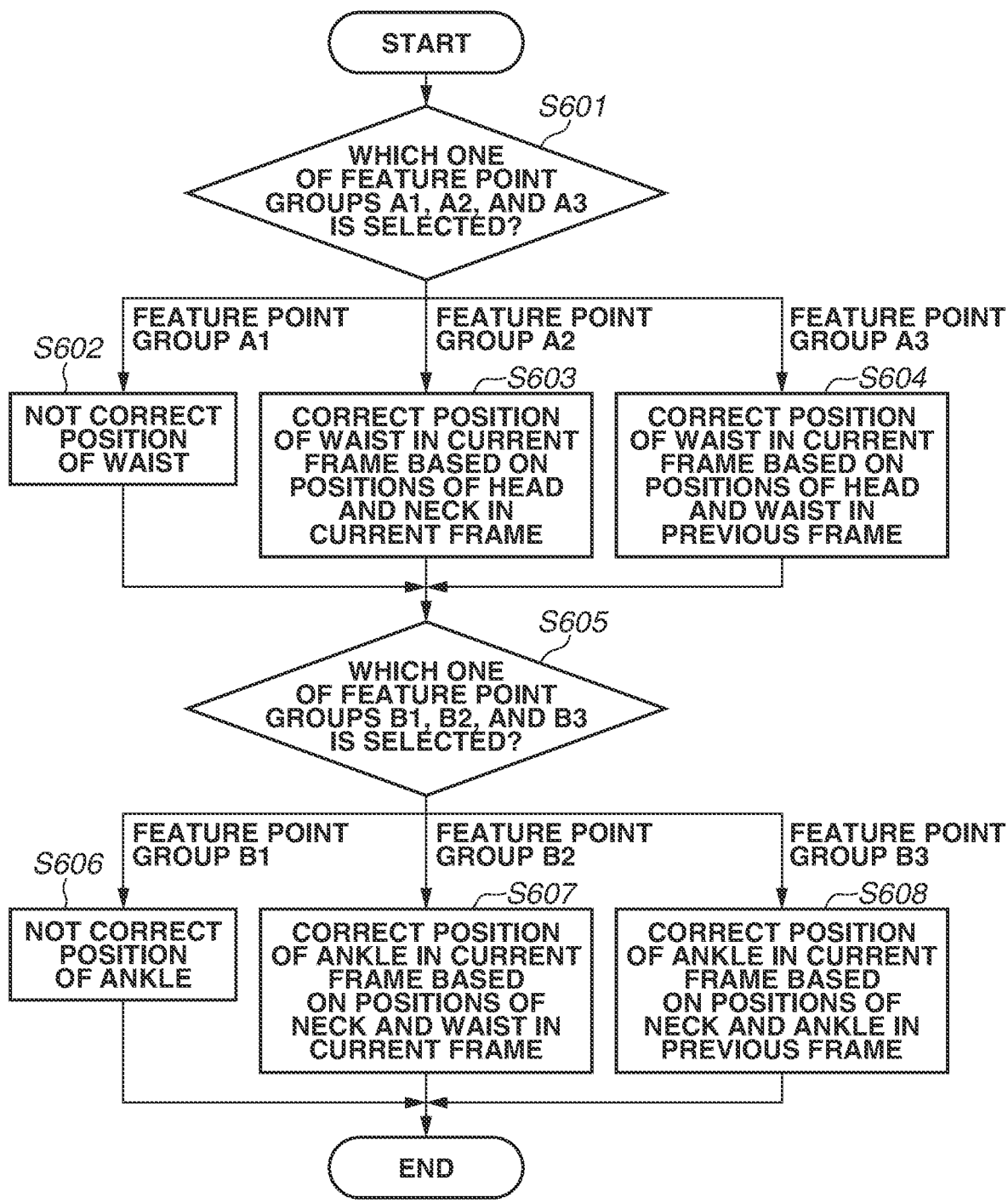
FIG. 6 is a flowchart illustrating a procedure of processing to be executed by the image processing apparatus.

In step S601 illustrated in FIG. 6, the second detection unit 104 determines which one of the feature point groups A1, A2, and A3 associated with the waist is selected. If the feature point group A1 is selected, the processing proceeds to step S602. If the feature point group A2 is selected, the processing proceeds to step S603. If the feature point group A3 is selected, the processing proceeds to step S604. In steps S602, S603, and S604, the second detection unit 104 detects the position of the feature point corresponding to the waist by the second detection method, In step S602, the second detection unit 104 does not correct the position of the feature point corresponding to the waist currently detected. This is because it is considered that the reliability of the feature point corresponding to the waist is higher than a certain threshold and thus the feature point is reliable based on previous processing.

Figure 7A:
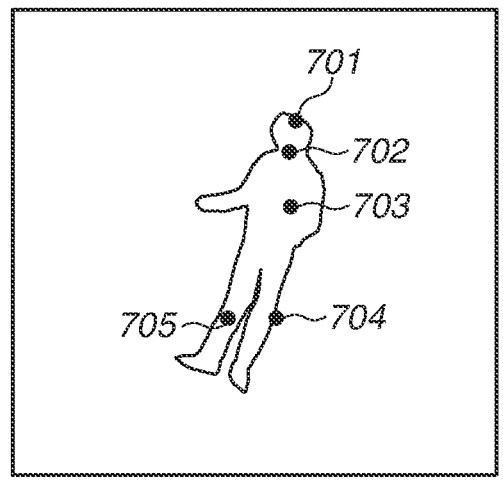
FIG. 7A illustrates an example of correction of a feature point corresponding to the waist of a person.
Figure 7B:
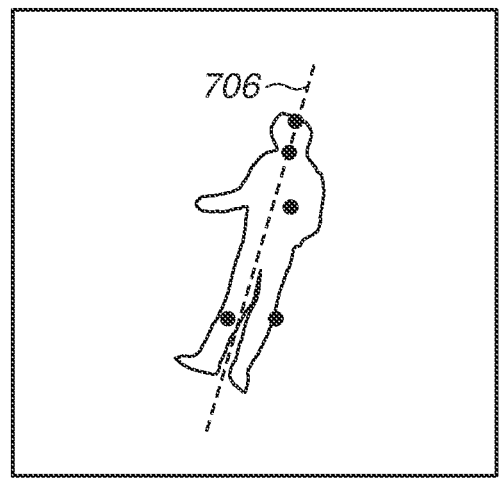
FIG. 7B illustrates an example of correction of a feature point corresponding to the waist of a person.
Figure 7C:
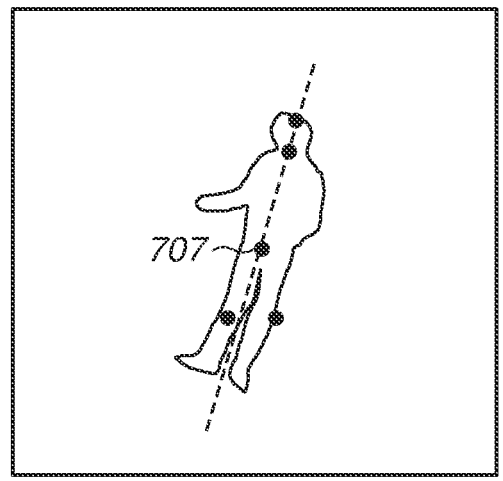
FIG. 7C illustrates an example of correction of a feature point corresponding to the waist of a person.

In step S603, the position of the waist is detected based on the positions of the head and the neck detected in the current image frame. The processing will be described with reference to FIGS. 7A to 7C. As illustrated in FIG. 7A, feature points corresponding to a head vertex 701, a neck 702, a waist 703, a right ankle 704, and a left ankle 705 are detected in step S402 illustrated in FIG. 4. First, as illustrated in FIG. 7B, a straight line 706 connecting the head and the neck is calculated. Further, a distance between the head and the neck is calculated based on position coordinates of the head and the neck. It can be assumed that a ratio between the distance between the head and the neck and a distance between the head and the waist is substantially the same among human bodies although the distances may vary from person to person. For this reason, the position of the waist is detected so that the position of the waist is present on the straight line 706 connecting the head and the neck and the ratio between the distance between the head and the neck and the distance between the head and the waist is a predetermined ratio. FIG. 7C illustrates an example of a feature point 707 corresponding to the waist after correction. The predetermined ratio can be determined based on, for example, ratios between human body parts of an average adult.

In step S604, the second detection unit 104 detects the position of the waist in the current frame based on the positions of the head and the waist in the previous frame. First, the distance between the head and the waist is calculated based on the feature points in the previous frame stored in the feature point storage unit 105. Next, in the current frame, ae straight line connecting the head and the neck is calculated in the same manner as in FIG. 7B. It is assumed herein that the distance between the head and the waist in the previous frame and the distance between the head and the waist in the current frame are substantially the same. Then, the position of the waist in the current frame is detected so that the position of the waist is present on the straight line connecting the head and the neck and the distance between the head and the waist in the current frame is equal to the distance between the head and the waist in the previous frame.

In step S605 illustrated in FIG. 6, the second detection unit 104 determines which one of the feature point groups B1, B2, and B3 associated with the ankle is selected. If the feature point group B1 is selected, the processing proceeds to step S606. If the feature point group B2 is selected, the processing proceeds to step S607. If the feature point group B3 is selected, the processing proceeds to step S608. In steps S607 and S608, the position of the feature point corresponding to the ankle is detected. In step S606, the second detection unit 104 does not correct the position of the feature point corresponding to the ankle currently detected.

Figure 8A:
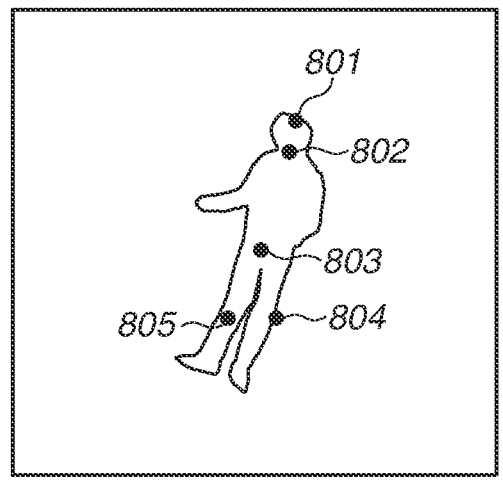
FIG. 8A illustrates an example of correction of a feature point corresponding to a foot of a person.
Figure 8B:
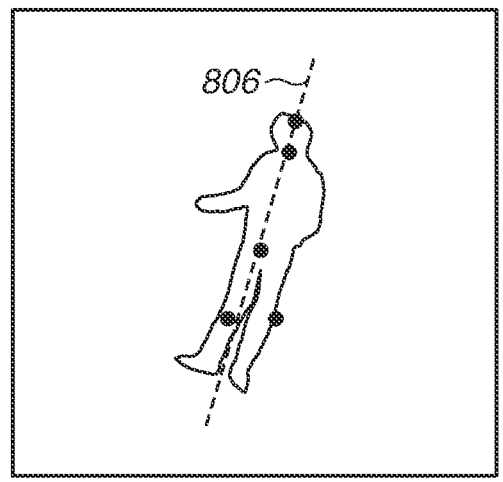
FIG. 8B illustrates an example of correction of a feature point corresponding to a foot of a person.
Figure 8C:
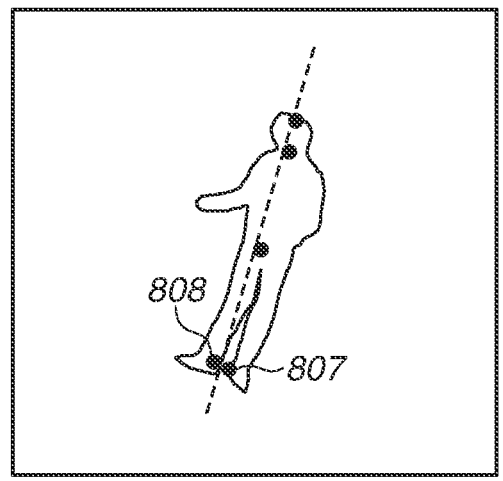
FIG. 8C illustrates an example of correction of a feature point corresponding to a foot of a person.

In step S607, the second detection unit 104 detects the position of the ankle based on the positions of neck and waist in the current frame. The processing will be described with reference to FIGS. 8A to 8C, As illustrated in FIG. 8A, feature points corresponding to a head vertex 801, a neck 802, a waist 803, a right ankle 804, and a left ankle 805 are detected in step S402 illustrated in FIG. 4. First, as illustrated in FIG. 8B, a straight line 806 (body axis) connecting the neck and the waist is calculated. Further, a distance between the neck and the waist is calculated based on position coordinates of the neck and the waist. It can be assumed that a ratio between the distance between the neck and the waist and a distance between the neck and the ankle is substantially the same among human bodies although the distances may vary from person to person. For this reason, the position of the ankle is detected so that the position of the ankle is present on the straight line 806 connecting the neck and the waist and the ratio between the distance between the neck and the waist and the distance between the neck and the ankle is a predetermined ratio. FIG. 8C illustrates an example where a feature point corresponding to an ankle 807 is detected.

In step S608, the second detection unit 104 detects the position of the ankle in the current frame based on positions of the neck and the ankle in the previous frame. First, the distance between the neck and the waist is calculated based on the feature points in the previous frame stored in the feature point storage unit 105. Next, in the current frame, a straight line (body axis) connecting the neck and the waist is calculated in the same manner as in FIG. 8B. It is assumed herein that the distance between the neck and the ankle in the previous frame and the distance between the neck and the ankle in the current frame are substantially the same. Then, the position of the ankle in the current frame is detected so that the position of the ankle is present on the body axis and the distance between the neck and the ankle in the current frame is equal to the distance between the neck and the ankle in the previous frame.

In steps S605, S606, S607, and S608 described above, only the right ankle has been described as the detection target. However, detection processing is also performed on the left ankle in the same manner as with the right ankle. The processing makes it possible to detect the position of the ankle with higher likelihood even if an ankle portion cannot be accurately detected by the first detection unit 102 due to occlusion or noise.

Figure 9A:
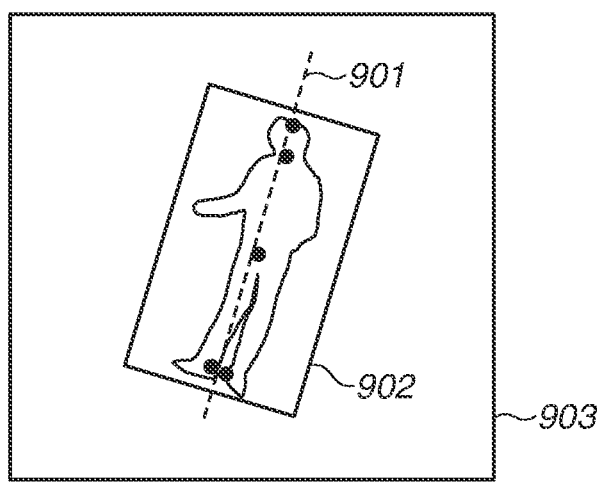
FIG. 9A illustrates processing for determining an object area.
Figure 18:
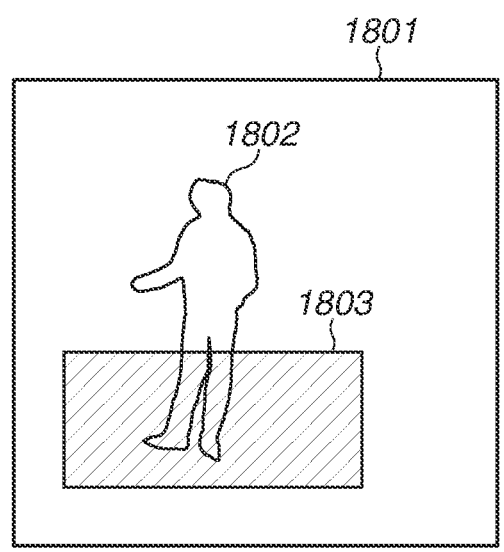
FIG. 18 illustrates an example of an occluded part of a person.

In step S405 illustrated in FIG. 4, the area determination unit 106 determines an area including the object based on the detected feature points. The partial image area indicates an area including a person in a captured image, and the partial image area is used to designate an area in which a person image is extracted from an image frame in the subsequent processing. The operation of step S405 corresponds to an operation of the area determination unit 106 illustrated in FIG. 1. The processing of step S405 will be described with reference to FIG. 9A. As illustrated in FIG. 9A, an image frame 903 includes feature points corresponding to the head vertex, the neck, the waist, the right ankle, and the left ankle. First, the area determination unit 106 calculates a midpoint between the right ankle and the left ankle. Next, the area determination unit 106 calculates a straight line 901 (body axis) connecting the head and the midpoint. In the present exemplary embodiment, the partial image area has a rectangle shape and an aspect ratio f the rectangle is preliminarily determined. The area determination unit 106 determines a rectangle 902 so that the longitudinal direction of the rectangle is parallel to the body axis, the central axis of the rectangle coincides with the body axis, the upper side of the rectangle contacts the head, and the lower side of the rectangle contacts the foot. In this case, a margin may be provided between the upper side of the rectangle and the head and between the lower side of the rectangle and the foot. For example, a margin of such a size that the distance between the head and the ankle (height) is multiplied by a certain coefficient may be provided. In other words, the partial image area is determined based on a circumscribed rectangle drawn around the feature points. In the present exemplary embodiment, the aspect ratio of the rectangle is fixed to facilitate input to the neural network to be described below, but instead may not be fixed depending on the configuration in the subsequent processing. In the case of using a corrected joint position, some parts of a person can be occluded or much noise can be generated in the determined area. For example, even if parts including the ankle are occluded by a screen 1803 as illustrated in FIG. 18, the area is determined as being an area including the parts of the person. Such area determination makes it possible to determine the partial image area in which the parts of the human body are consistently arranged in the rectangle. If the parts are consistently arranged, an advantageous effect can be obtained where a feature amount of each part in which the feature of each part is reflected more accurately can be extracted in the subsequent feature amount extraction processing.

Figure 9B:
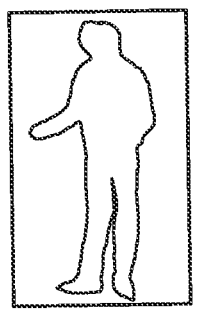
FIG. 9B illustrates processing for determining an object area.

In step S406 illustrated in FIG. 4, the image extraction unit 107 clips the partial image area determined in step S405 as a person image from the image frame. If the rectangle of the partial image area determined in step S405 is inclined, the image is rotated so that the rectangle is in an upright position. FIG. 9B illustrates an example where the area is clipped from the image frame 903 illustrated in FIG. 9A. The operation of step S406 corresponds to an operation of the image extraction unit 107 illustrated in FIG. 1.

In step S407, the feature point storage unit 105 stores the corrected part in the current frame. The operation of step S407 corresponds to an operation of the feature point storage unit 105 illustrated in FIG. 1.

In step S408, the image feature extraction unit 108 extracts a feature amount from the partial image area (person image). The operation of step S408 corresponds to an operation of the image feature extraction unit 108 illustrated in FIGS. 1 and 2. The operation of step S408 will be described with reference to a flowchart illustrated in FIG. 10.

Figure 10:
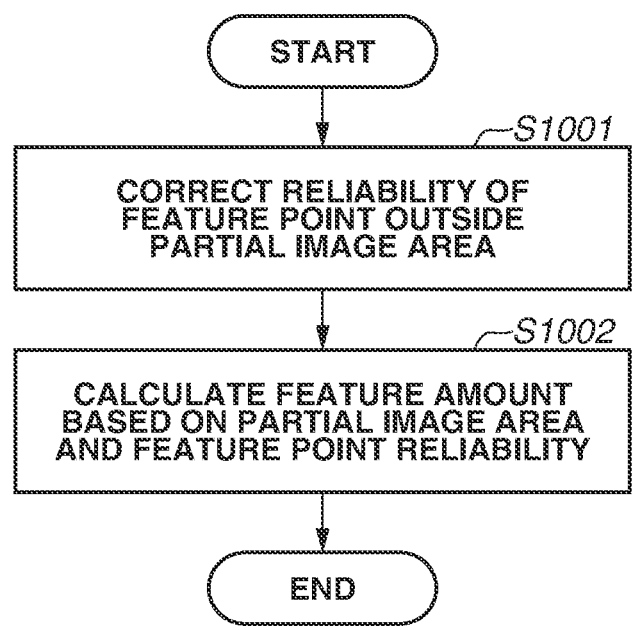
FIG. 10 is a flowchart illustrating a procedure of processing to be executed by the image processing apparatus.
Figure 11:
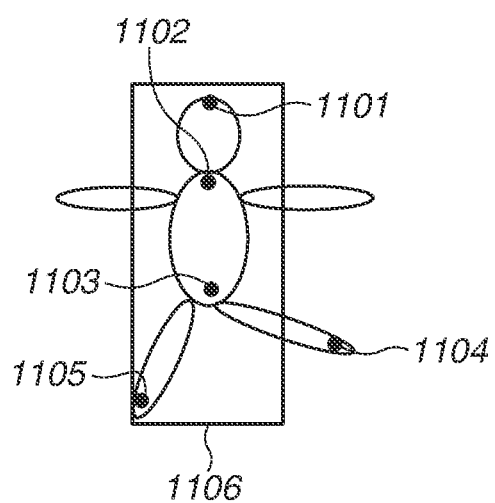
FIG. 11 illustrates processing for correcting a feature point outside a partial image area.

In step S1001 illustrated in FIG. 10, the out-of-area feature point correction unit 202 corrects the reliability of a feature point outside the partial image area based on the coordinates of the partial image area and the feature point. Step S1001 is processing to be executed by the out-of-area feature point correction unit 202 illustrated in FIG. 2. When the aspect ratio of the rectangle indicating the partial image area is fixed, there may be a feature point not included in the partial image area, for example, when an arm or a leg is outstretched. A human body part outside the partial image area falls outside the feature extraction range, and thus, there is an issue that the accuracy of feature extraction in the part is reduced. Accordingly, in order to alleviate an effect thereof, in the subsequent steps, an adjustment is made to lower the reliability of the feature point outside the partial image area. For example, as illustrated in FIG. 11, a right ankle 1104 is outside a rectangle 1106. Thus, the reliability of the feature point corresponding to the right ankle 1104 is lowered. In the present exemplary embodiment, a value obtained by multiplying the original reliability by a predetermined real number value smaller than 1 is used as the corrected reliability. Thus, the reliability of the feature point outside the partial image area is lowered, thereby the issue of deterioration in the accuracy of feature extraction due to a human body part being placed outside the partial image area and the issue of deterioration in the accuracy of feature extraction due to the occlusion are solved in the subsequent common processing.

Figure 12:
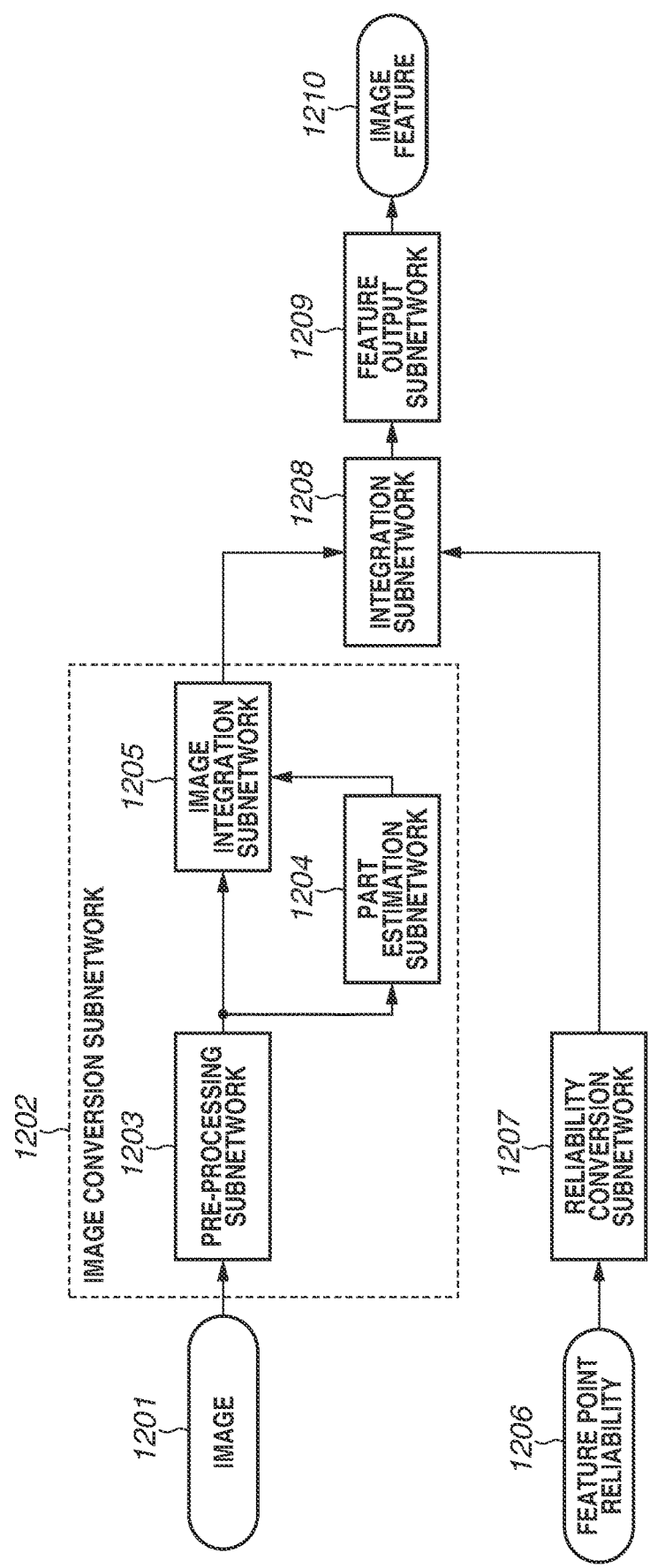
FIG. 12 is a block diagram illustrating an example of a structure of a neural network.

In step S1002, the image feature output unit 207 extracts a feature amount based on the partial image area and the reliability of each feature point. In the feature amount extraction, the neural network to be described below can be used. FIG. 12 is a block diagram illustrating an example of a configuration of the neural network. The neural network illustrated in FIG. 12 receives an image 1201 and a feature point reliability 1206 as inputs, and outputs an image feature 1210. The neural network includes an image conversion subnetwork 1202, a reliability conversion subnetwork 1207, an integration subnetwork 1208, and a feature output subnetwork 1209. The image conversion subnetwork 1202 corresponds to the intermediate image feature extraction unit 204 illustrated in FIG. 2. The reliability conversion subnetwork 1207 corresponds to the reliability conversion unit 205 illustrated in FIG. 2. The integration subnetwork 1208 corresponds to the feature integration unit 206 illustrated in FIG. 2. The feature output subnetwork 1209 corresponds to the image feature output unit 207 illustrated in FIG. 2.

Input data, intermediate data, output data that are used in the neural network are treated as a tensor. The tensor is data represented as a multi-dimensional array and the number of dimensions of the multi-dimensional array is referred to as an order. A tensor of zeroth order is referred to as a scalar. A tensor of first order is referred to as a vector. A tensor of second order is referred to as a matrix. For example, an image in which the number of channels is one (e.g., grayscale image) can be treated as a second order tensor with a size of H×W, or a third order tensor with a size of H×W×1. An image including red, green, and blue (RGB) components can be treated as a third order tensor with a size of H×W×3.

Data obtained by extracting a plane where a tensor is cut at a certain position in a certain dimension and the operation are referred to as slicing. For example, a third order tensor with a size of H×W×C is sliced at a c-th position in a third dimension, thereby the second order tensor with the size of H×W or the third order tensor with the size of H×W×1 is obtained.

A layer in which a convolution operation is performed on a certain tensor is referred to as a convolutional layer (abbreviated as Conv.). A coefficient for a filter used in the convolution operation is referred to as a weight. For example, an output tensor with a size of H×W×D is generated from an input tensor with a size of H×W×C in the convolutional layer.

A layer in which an operation for multiplying a certain vector by a weighting matrix and adding a bias vector is performed is referred to as a fully-connected layer (abbreviated as FC). For example, a vector with a length D is generated by applying the fully-connected layer based on a vector with a length C.

An operation for dividing a certain tensor into segments and taking a maximum value of each segment to reduce the size of the tensor is referred to as maximum pooling. In the case of taking an average value of the segment instead of the maximum value, the operation is referred to as average pooling. In the present exemplary embodiment, the maximum pooling is used, and a layer in which the maximum pooling is performed in the neural network is simply referred to as a pooling layer (abbreviated as pooling). In the present exemplary embodiment, the pooling layer outputs a tensor in which the size of a first dimension and the size of a second dimension are each one-half the size of an input tensor. Specifically, an output tensor with a size of H/2×W/2×C is generated based on an input tensor with a size of H×W×C.

In the neural network, a nonlinear function to be generally applied after the convolutional layer is referred to as an activation function. Examples of the activation function include a rectified linear unit (abbreviated as ReLU) and a sigmoid function. In particular, the sigmoid function has the property that an output value range is from 0 to 1. In the present exemplary embodiment, unless otherwise specified, ReLU is used as the activation function, In the neural network, an operation of arranging tensors in a certain dimensional direction and connecting the tensors is referred to as connection.

Global average pooling will be described. In a third order tensor with a size of H×W×C, slices are obtained at all positions in the third dimension, and an average value of all elements included in each slice is obtained. C average values are arranged to thereby generate a vector with the length C. The operation is referred to as global average pooling.

In FIG. 12, the image 1201, which is an input to the neural network, has a width W1, a height H1, and the number of channels of 3. In other words, the image 1201 can be regarded as a tensor with a size of H1×W1×3.

The image conversion subnetwork 1202 converts the image 1201 into a feature map. The image conversion subnetwork 1202 includes a pre-processing subnetwork 1203, a part estimation subnetwork 1204, and an image integration subnetwork 1205.

The image conversion subnetwork 1202 extracts a feature amount for identifying an object for each part corresponding to the detected feature point. Specifically, as discussed in the paper written by L. Zhao et. al., a module for estimating a part and extracting a feature of the part is included (L. Zhao et al. "Deeply-Learned Part-Aligned Representations for Person Re-Identification," IEEE, 2017). The image conversion subnetwork 1202 corresponds to the object part extraction unit 203 illustrated in FIG. 2. In the present exemplary embodiment, the object part extraction unit 203 is caused to operate in the neural network for feature extraction, but instead the object part extraction unit 203 may be caused to operate outside the neural network and may be provided with information about the position and size of each part from the outside. Further, the object part extraction unit 203 and the first detection unit 102 illustrated in FIG. 1 may have common functions, and information derived from the output from the first detection unit 102 may be used as an output from the object part extraction unit 203, or vice versa. Feature amounts of the respective parts extracted in the present exemplary embodiment are integrated into an entire feature amount in the subsequent processing. In this case, weighting is performed to reflect the feature amounts of the respective parts in the entire feature amount depending on the reliability of each feature point. In other words, a feature amount extracted from a part corresponding to a feature point with a low reliability is prevented from contributing to a final recognition result. This is because the feature point with the low reliability may indicate that an object is occluded or much noise is generated, and thus the feature amount extracted from the part does not always indicate the feature of the part of the object. By executing the above-described processing, it is expected that an advantageous effect of generating a feature amount in which object features are reflected more accurately and improving the accuracy of object recognition can be obtained.

Figure 16A:
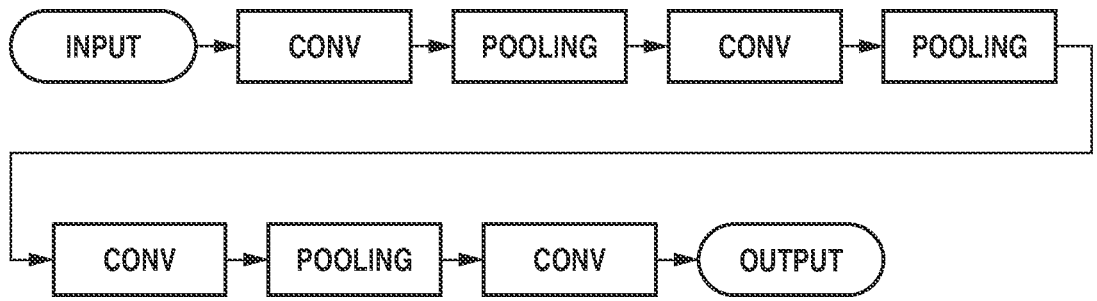
FIG. 16A illustrates a configuration example of a subnetwork.

The image conversion subnetwork 1202 is composed of a sequence of one or more layers of the convolutional layer (Conv) and the maximum pooling layer (Pooling). In the present exemplary embodiment, the image conversion subnetwork 1202 is composed of, for example, a sequence of Conv Conv Pooling, Conv, Pooling, Conv, Pooling, and Conv. FIG. 16A schematically illustrates a configuration of the sequence. As a result of applying the image conversion subnetwork 1202 to an image, a tensor with a size of H2×W2×C2 is obtained.

Figure 16B:
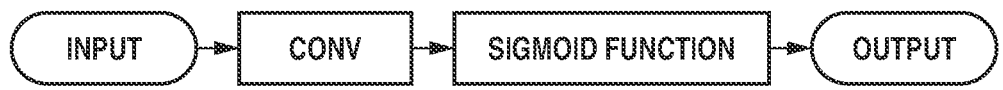
FIG. 16B illustrates a configuration example of a subnetwork.

The part estimation subnetwork 1204 receives the output from the image conversion subnetwork 1202 as an input, and outputs a tensor with a size of H2×W2×P1 that is a feature map. In this case, P1 represents the number of parts to be estimated. P1 may be any number determined in advance. A slice (tensor with a size of H2×W2×1) at a position p in the third dimension in this tensor is a mask image indicating a position where a p-th part is present. Each pixel takes a value in a range from 0 to 1, and a value closer to 1 indicates a higher likelihood that the part is present at the position. The part estimation subnetwork 1204 is composed of a single convolutional layer and a single sigmoid function. FIG. 16B schematically illustrates a configuration of the part estimation subnetwork 1204. The configuration of the part estimation subnetwork 1204 is not limited to this example, however, and the part estimation subnetwork 1204 may be composed of a plurality of convolutional layers.

The image integration subnetwork 1205 integrates an output from the image conversion subnetwork 1202 with an output from the part estimation subnetwork 1204. FIG. 17 illustrates a procedure of processing. First, C2 copies of a slice 1702 (tensor with a size of H2×W2×1) at the position p in the third dimension of an output tensor 1701 of the part estimation subnetwork 1204 are generated, and the generated copies of the slice 1702 are connected in the third dimensional direction, thereby the tensor is expanded to be a tensor 1703 with a size of H2×W2×C2. Then, each element of the tensor 1703 is multiplied by each element of an output tensor 1704 of the image conversion subnetwork 1202, thereby a new tensor 1705 (with a size of H2×W2×C2) is generated. Then, global average pooling is applied to the tensor 1705 to thereby generate a vector 1706 with a length C2. Further, the fully-connected layer is applied to the vector 1706, thereby a vector 1707 with a length C3 is generated. The processing is applied to a channel p for all of the parts, thereby a vector 1708 in which the generated vectors are connected is generated. Specifically the vector 1708 generated by the image integration subnetwork 1205 has a length of (C3) P1. In the present exemplary embodiment, the vectors are data to be integrated, and each of the vectors is a type of tensor. Even when a tensor of second or higher order is the data to be integrated, the data may also be integrated by connection.

The feature point reliability 1206 is a vector with a length C4. In the present exemplary embodiment, the number of feature points detected in step S402 illustrated in FIG. 4 is five, and thus C4=5.

Figure 16C:
FIG. 16C illustrates a configuration example of a subnetwork.

The reliability conversion subnetwork 1207 converts the feature point reliability 1206 into a vector with a length C5. The reliability conversion subnetwork 1207 can be composed of 0 or more fully-connected layers. In the present exemplary embodiment, the reliability conversion subnetwork 1207 is composed of one fully-connected layer. FIG. 16C schematically illustrates a configuration of the reliability conversion subnetwork 1207.

Figure 16D:
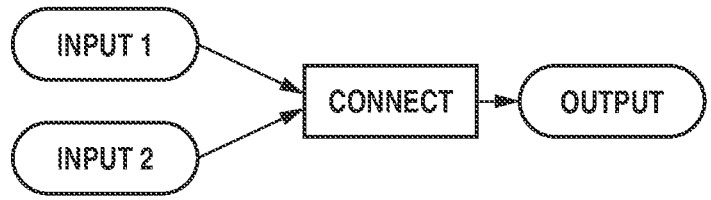
FIG. 16D illustrates a configuration example of a subnetwork.

The integration subnetwork 1208 integrates an output vector from the image integration subnetwork 1205 with an output vector from the reliability conversion subnetwork 1207. The integration subnetwork 1208 outputs a vector with a length C6. In the present exemplary embodiment, the two vectors are connected. FIG. 16D schematically illustrates a configuration of the integration subnetwork 1208. Accordingly, C6=(C3) P1+C5.

Figure 16E:
FIG. 16E illustrates a configuration example of a subnetwork.

The feature output subnetwork 1209 receives the output vector from the integration subnetwork 1208 as an input, and outputs the image feature 1210 that is a vector with a length C7. The feature output subnetwork 1209 can be composed of one or more fully-connected layers. In the present exemplary embodiment, the feature output subnetwork 1209 is composed of two fully-connected layers. FIG. 16E schematically illustrates a configuration of the feature output subnetwork 1209. The image feature 1210 is also referred to as a re-identification feature, person feature, descriptor, or embedding.

In step S409 illustrated in FIG. 4, the recognition unit 109 compares the feature amount of the person image extracted in step S408 with feature amounts stored in a person database. The person database is a storage unit in which clipped images of N persons to be identified and feature amounts (feature vectors) are registered in advance. An image of each person to be identified is captured in advance, and image clipping and feature amount extraction are performed in the same manner as in steps S402 to S408. Then, the obtained images and feature amounts are stored. The person database is stored in the object storage unit 112 illustrated in FIG. 1. In step S409, the recognition unit 109 calculates the distance between the feature amount of each person in the person database and the feature amount of the person image extracted in step S408. Persons in the person database are rearranged in ascending order of distance, and the person with the smallest distance is placed at the top of an arrangement. Step S409 corresponds to the processing to be executed by the recognition unit 109 illustrated in FIG. 1. In the present exemplary embodiment, a Euclidean distance is used to compare the feature amounts. The feature amounts may be compared by another method. Other distance indices such as $L_1$ distance and cosine distance may be used, and feature amounts may be compared by metrics learning or machine learning using a neural network or the like.

Figure 14:
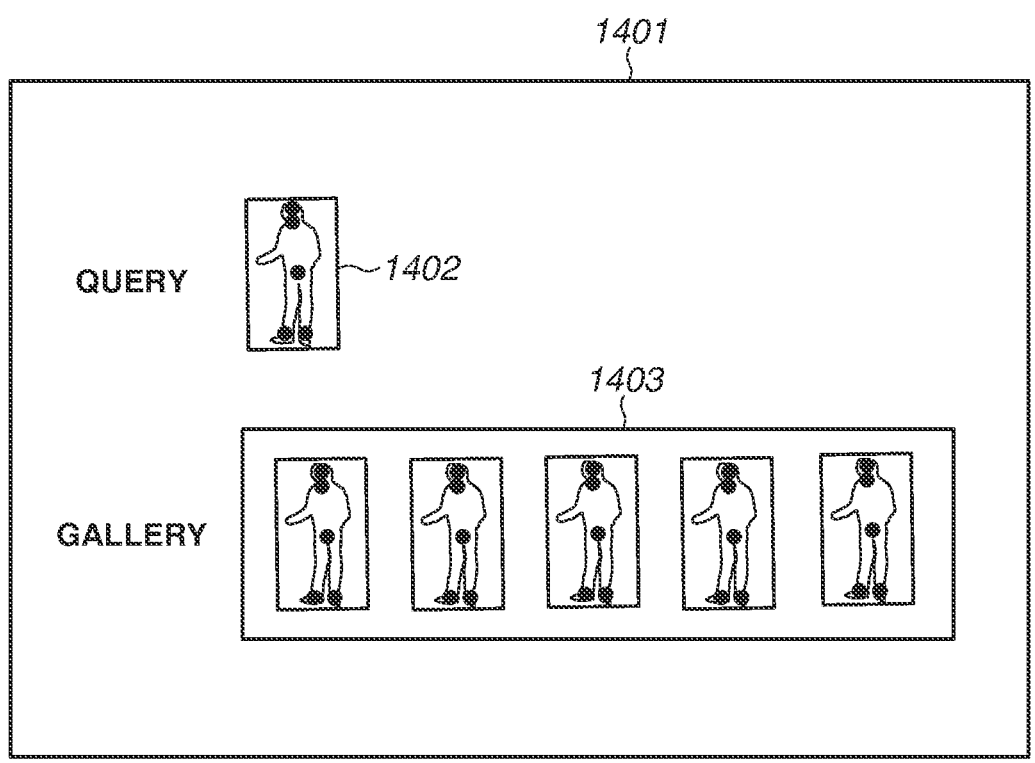
FIG. 14 illustrating a screen display example.

In step S410 illustrated in FIG. 4, the display unit 110 displays, on a screen, the corresponding person determined in step S409. Step S410 corresponds to the processing to be executed by the image display unit 110 illustrated in FIG. 1. FIG. 14 illustrates a display screen example. A display screen 1401 is composed of a query 1402 and a gallery 1403. The query 1402 is an image of a person to be searched. The person image extracted in step S406 is displayed. The gallery 1403 is a list of search results. The images of the top five persons in the person database that are rearranged in the ascending order of distance in step S409 are displayed in order. In this case, the top five persons may be displayed, or only persons with a distance being less than or equal to a predetermined threshold among the five persons may be displayed. Images to be displayed in the gallery 1403 may be clipped in the same manner as in steps S401 to S407 illustrated in FIG. 4, or may be clipped by another method. A marker indicating the position of each of the detected feature points may be displayed and superimposed on the image of the person in the query and the gallery as illustrated in FIG. 14.

In step S411 illustrated in FIG. 4, the image processing apparatus 10 determines whether to end the processing in the flowchart. In the present exemplary embodiment, if the number of executions of step S411 is more than or equal to a prescribed number (YES in step S411), the image processing apparatus 10 determines that the processing is to be ended. If the number of executions of step S411 is less than the prescribed number (NO in step S411), the processing returns to step S401, and the processing in the flowchart is continued.

<Training of Neural Network>

A method for training a neural network used in the image feature extraction unit 108 illustrated in FIG. 1 will be described with reference to a flowchart illustrated in FIG. 13. The processing in the flowchart illustrated in FIG. 13 corresponds to the operation of the learning unit 111 illustrated in FIG. 1.

FIG. 12 illustrates a structure of the neural network as described above. The neural network receives the image 1201 and the feature point reliability 1206 as inputs, and outputs the image feature 1210.

The neural network performs learning using a triplet loss (F. Shroff et al., "Face Net: A Unified Embedding for Face Recognition and Clustering," arXiv: 1503.03832). The triplet loss uses a triplet including an anchor sample, a positive sample that is a sample of a person identical to that of the anchor sample, and a negative sample that is a sample of a person different from that of the anchor sample. Feature amounts obtained from the anchor sample, the positive sample, and the negative sample are compared with each other to calculate a loss function, thereby the network is updated.

Figure 13:
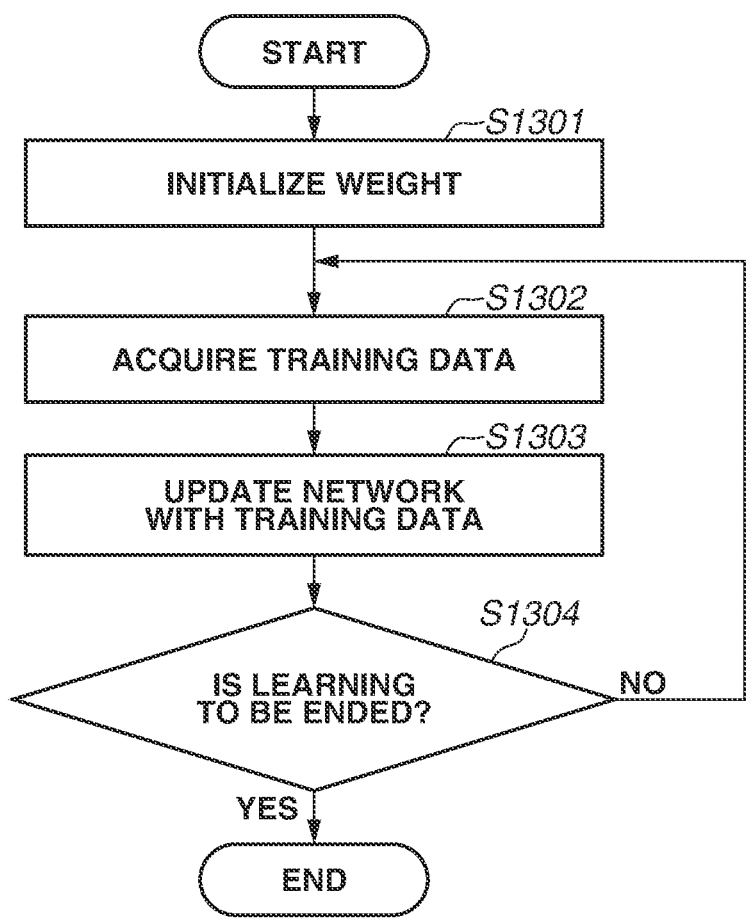
FIG. 13 is a flowchart illustrating a procedure of processing for causing the neural network to perform learning.

In step S1301 illustrated in FIG. 13, the learning unit 111 initializes the weight of each of the convolutional layer and the fully-connected layer that constitute the network. In the present exemplary embodiment, a random number is used as an initial value of the weight.

In step S1302, the learning unit 111 randomly acquires training data from a training data set. One piece of training data is a triplet including an anchor sample, a positive sample, and a negative sample. Each of the anchor sample, the positive sample, and the negative sample is composed of an image and a feature point reliability. The image and the feature point reliability are generated in the same procedure as that for the image and the feature point reliability input to the neural network used in the flowchart illustrated in FIG. 4.

In step S1303, the learning unit 111 updates the network with the training data. First, the network in the current state is applied to each of the anchor sample, the positive sample, and the negative sample, and the feature amounts for the respective samples are calculated. A loss for the three feature amounts is calculated by triplet loss. Then, the weights in the network are updated by a backpropagation method.

In step S1304, the learning unit 111 determines whether to end the learning. If step S1304 has been executed a prescribed number of times, the learning unit 111 determines that the learning is to be ended (YES in step S1304), and the series of procedures of the processing in the flowchart illustrated in FIG. 13 ends. If the learning unit 111 determines that the learning is not to be ended (NO in step S1304), the processing returns to step S1302.

In the present exemplary embodiment, the feature point group determination unit 103 and the second detection unit 104 can perform detection again on an unfavorable feature point based on the favorable feature point. Thus, it is expected that an error in determination of an object area by the area determination unit 106 can be reduced even in a situation where part of the object is occluded by another object or receives a disturbance.

It is assumed that, for an area where part of the object is occluded by another object or receives a disturbance, the reliability of the feature point acquired by the first detection unit 102 is output while being reduced compared to the reliability thereof during the normal operation. In this case, it is considered that the quality of the image feature for image recognition extracted from the local areas is also reduced. Accordingly, the image feature extraction unit 108 uses information about the reliability of each feature point as an index indicating the reliability of a certain local area, thereby an effect of alleviating the reduction in the quality of the image feature can be expected. Thus, it is expected that an effect of improving the image recognition accuracy can be obtained.

In step S1001 illustrated in FIG. 10, the reliability of a feature point outside the partial image area is reduced. A human body part outside the partial image area falls outside the feature extraction range, and thus, there is an issue that the accuracy of feature extraction in the part is reduced. To alleviate an effect thereof, in the subsequent steps, the reliability of each feature point outside the partial image area is reduced, thereby the effect of alleviating the reduction in the quality of the image feature can be expected.

In steps S403 and S404, the feature point group used for correction is selected and a feature point is corrected using not only a feature point in the current frame, but also a feature point in the previous frame. The use of the feature point in the previous frame makes it possible to improve the accuracy of feature point correction even in a case where the reliability of the feature point in the current frame is low.

In step S403, the feature points are selected in a predetermined order. A feature point expected to have higher accuracy is preferentially selected in correction of the feature point position in step S404, thereby an effect of more accurately correcting the feature point position can be expected.

In step S404, the feature points are corrected in a predetermined order. In this case, the feature points are corrected in the order of waist and foot. This is because body parts of a person are connected in the order of neck, waist, and foot. First, the position of the waist is corrected, and then the position of the foot can be corrected using the accurate position of the waist. In this manner, the feature points are compared in the predetermined order, thereby the effect of correcting the feature point position more accurately can be expected.

In step S404, the position of each feature point is corrected based on a relative positional relationship between feature points. In the exemplary embodiment, a feature point is corrected based on a ratio between distances between feature points and a straight line (body axis) calculated from the feature points. Thus, it is expected that the position of each feature point can be more accurately corrected using previous knowledge about the structure of the object.

Modification of First Exemplary Embodiment

The feature points extracted in step S402 are not limited to the head vertex, the neck, the waist, the right ankle, and the left ankle, but instead the feature points can be extracted from other parts such as a wrist, an elbow, and a knee. Each feature point to be extracted need not necessarily be present on a body part, but instead may be any other point determined based on a positional relationship between body parts, such as an intermediate point between the right ankle and the left ankle, or an intersection between the body axis and a line connecting the left ankle and the right ankle.

In step S604, the position of the waist in the current frame is corrected based on the distance between the head and the waist in the previous frame, but instead another method may be employed. The position of the waist in the current frame may be corrected based on a difference between the position coordinates of the head and the waist in the previous frame. For example, as for the difference between the position coordinates of the head and the waist in the previous frame, the x-coordinate and y-coordinate of the waist are larger than the x-coordinate and y-coordinate of the head by an X-pixel and a Y-pixel, respectively. The position of the waist in the current frame may be corrected to match the difference between the position coordinates of the head and the wait in the previous frame. Instead of using the difference between the position coordinates of the head and the waist, a difference between the position coordinates of the neck and the waist may be used.

In step S607, the ratio between the distance between the neck and the waist of the human body and the distance between the neck and the right ankle (or the left ankle) is used. However, the ratio between distances between feature points is not limited to this example, and a ratio between distances between other feature points can also be used. For example, the head may be used in place of the neck, so that a ratio between the distance between the head and the waist and the distance between the head and the right ankle (or the left ankle) may be used. In another example, a ratio between the distance between the head and the neck and the distance between the waist and the right ankle (or the left ankle) may be used. The same holds true for step S608.

In step S607, the feature points are corrected so that the right ankle or the left ankle is present on the body axis. The correction method is not limited to this example. For example, the correction can be performed so that the right ankle (or the left ankle) is moved in the direction of the body axis to make the ratio between the feature points a predetermined ratio.

The area determination unit 106 uses the rectangular partial image area, but instead may use the partial image area having another shape. For example, a polygonal shape or a shape surrounded by a curve may be used. Instead of using a shape, a mask image that distinguishes an object area from other areas may be used.

The structure of the neural network according to the first exemplary embodiment is not limited to the above-described structure. For example, a subnetwork may be interposed between the subnetworks. The network may have a different branch structure. The subnetworks may include different types of components, such as the convolutional layer, the pooling layer, and the fully-connected layer, and the different numbers of components.

The integration subnetwork 1208 illustrated in FIG. 12 integrates two vectors by connecting the two vectors, but instead may use another calculation method. For example, multiplication or addition of vector elements may be used if the two vectors have the same size, The reliability conversion unit 205 illustrated in FIG. 2 is implemented as the reliability conversion subnetwork 1207 as illustrated in FIG. 12, but instead the reliability conversion unit 205 may be provided outside the neural network. For example, processing, such as normalization processing or conversion processing, may be performed on the reliability of each feature point outside the neural network, and a processing result may be used as an input to the neural network.

In the correction of feature points in steps S403 and S401 illustrated in FIG. 4, the selection of the feature point group used for correction and the correction of feature point are performed using the current frame and the previous frame. The selection of the feature point group and the correction of feature point may be performed using not only the previous frame, but also a frame preceding the previous frame. Further, three or more frames may be used in combination with the current frame.

The image feature extraction unit 108 is composed of a neural network, but instead may use a method other than the neural network. For example, a Histogram of Oriented Gradients (HOG) feature or Local Binary Pattern (LBP) feature may be extracted, and an image feature may be determined based on the extracted feature. In addition, parts may be estimated using the HOG feature or the LBP feature, In step S603 illustrated in FIG. 6, the straight line 706 illustrated in FIG. 7B is calculated based on the positions of the head and the neck, but instead the straight line may be calculated based only on the position of the head or the neck. For example, in a case where the body axis of the person is assumed to be parallel to a y-axis of an image frame, the straight line is assumed to be parallel to the y-axis of the image frame, and thus the straight line can be calculated based only on one point corresponding to the neck or the head. Similarly, in step S405 illustrated in FIG. 4, the straight line 901 illustrated in FIG. 9A is calculated based on a plurality of points, but instead may be calculated based only on one point.

In step S1001 illustrated in FIG. 10, the value obtained by multiplying the original reliability by the predetermined real number value smaller than 1 is used as the corrected reliability. However, another method may be used. The method for updating the reliability is not limited to this method. The reliability may be set to 0, or the predetermined real number value may be subtracted from the reliability, or another method may be used.

As described above, the processing described in the first exemplary embodiment makes it possible to detect a feature point corresponding to a part that can hardly be seen even in a case where part of the object in the image is occluded or much noise is generated.

Second Exemplary Embodiment

While the first exemplary embodiment uses the whole body of a person as the image processing target, the face of a person may be used as the image processing target. Only differences between a second exemplary embodiment and the first exemplary embodiment will be described.

Figure 15:
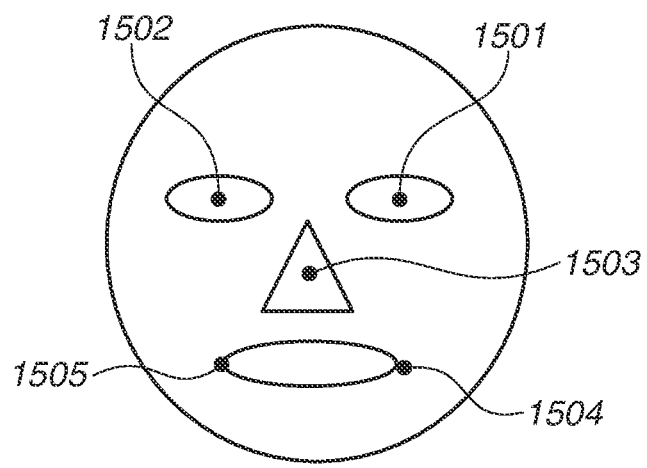
FIG. 15 illustrates examples of parts of a face.

If the face of a person is used as the image processing target, in step S402 illustrated in FIG. 4, face feature points are detected. FIG. 15 illustrates examples of the face feature points. In this case, a right eye 1501, a left eye 1502, a nose 1503, a mouse right edge 1504, and a mouse left edge 1505 are detected as feature points.

The second exemplary embodiment describes a case where the feature point corresponding to the right eye is corrected based on the positions of the nose and the mouse in steps S403 and S404. Processing to be executed on the left eye is similar to the processing executed on the right eye.

The processing of step S403 will be described. First, the reliability of the feature point corresponding to the right eye is evaluated. In a case where the reliability is more than or equal to a threshold, a feature point group C1 is selected. In a case where the reliability is lower than the threshold, a feature point group C2 is selected if the reliability of the right eye in the previous frame is lower than the threshold, and a feature point group C3 is selected if the reliability of the right eye in the previous frame is more than or equal to the threshold.

The processing of step S404 will be described. If the feature point group is selected as the feature point group used for correction, the position of the right eye is not corrected. If the feature point group C2 is selected, the position of the right eye in the current frame is corrected so that arrangement of facial parts in the current frame is close to arrangement of facial parts of an average person, based on a positional relationship among the nose, the mouse right edge, and the mouse left edge in the current frame. If the feature point group C3 is selected, the position of the right eye in the current frame is corrected so that the arrangement of facial parts in the current frame is close to arrangement of the right eye, the nose, the mouse right edge, and the mouse left edge in the previous frame.

The processing of other steps according to the second exemplary embodiment is similar to the processing thereof according to the first exemplary embodiment, except that the feature points extracted from the whole body are replaced by the face feature points.

In the second exemplary embodiment, the right eye, the left eye, the nose, the mouse right edge, and the mouse left edge are used as the face feature points, but instead other parts, such as an outer corner of an eye, an inner corner of an eye, a pupil, a nose right edge, a nose lower edge, an eyebrow, and a facial contour, may be used as the feature points. The processing of steps S403 and S404 may be changed depending on the feature points to be used.

In the second exemplary embodiment, the effect of improving the performance of clipping of a face image from an image frame and face recognition can be expected. For example, the second exemplary embodiment is effective in a case where the face of a person is partially covered with an accessory, such as sunglasses or a mask, or in a case where part of the face is temporarily covered with a hand or the like.

The present invention can also be implemented by executing the following processing. Specifically, software (program) for implementing the functions according to the above-described exemplary embodiments is supplied to a system or an apparatus via a network or various storage media for data communication. Then, a computer (a CPU, a micro processing unit (MPU), or the like) in the system or the apparatus reads the program and executes the program. The program may be recorded and provided on a computer-readable recording medium.

The present invention is not limited to the above-described exemplary embodiments. The present invention can be changed or modified in various ways without departing from the spirit and scope of the present invention. Accordingly, the following claims are attached to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
at least one memory storing instructions; and
at least one processor that, upon execution of the stored instructions, are configured to:
detect, from an image in which an object including a plurality of parts is captured, first feature points corresponding to the parts of the object;
acquire a reliability indicating a likelihood that a position indicated by a feature point is a part corresponding to the feature point for each of the first feature points detected;
detect a second feature point based on some of the first feature points for a part corresponding to a first feature point with the low reliability; and
determine an area including the object based on some of the first feature points and the second feature point.

2. The image processing apparatus according to claim 1, wherein the second feature point detected is obtained by correcting a position of a part indicated by the first feature point whose reliability is lower than a predetermined value among the first feature points based on the first feature point indicating a position of a part close to the part indicated by the first feature point whose reliability is lower than the predetermined value among the first feature points.

3. The image processing apparatus according to claim 1, wherein the second feature point detected is obtained by correcting a position of a part indicated by the first feature point whose reliability is lower than a predetermined value among the first feature points based on the first feature point whose reliability is higher than the predetermined value among the first feature points.

4. The image processing apparatus according to claim 1, wherein the second feature point obtained by correcting a position of a part indicated by the first feature point with the low reliability among the first feature points based on a positional relationship among the plurality of parts included in the object.

5. The image processing apparatus according to claim 4, wherein positions of a head, a neck, a waist, and an ankle of a person is detected as the first feature points, and
wherein, in a case where the reliability of the position of the ankle is low, the position of the ankle is detected as the second feature point based on a positional relationship between one of the head and the waist of the person and the ankle of the person.

6. The image processing apparatus according to claim 1, wherein the second feature point is detected for the part indicated by the first feature point whose reliability is lower than the predetermined value among the first feature points detected, based on the first feature point indicating the part and whose reliability is higher than a predetermined value in a previous image.

7. The image processing apparatus according to claim 6, wherein positions of a head, a neck, a waist, and an ankle of a person are detected as the first feature points from the image,
wherein the reliability of the position of the ankle of the person is acquired in a previous image captured before the image is captured, and
wherein, in a case where the reliability of the position of the ankle of the person in the previous image is higher than the predetermined value, the position of the ankle of the person in the previous image is detected as the second feature point in the image.

8. The image processing apparatus according to claim 1, wherein the object is a person, and
wherein the first feature points are detected by inputting the image to a trained model obtained by learning of feature points corresponding to the parts of the person as the first feature points of the person.

9. The image processing apparatus according to claim 1, wherein the at least one processor is further configured to:
extract a feature amount for recognizing the object based on a partial image obtained by clipping the area determined from the image; and
recognize whether the object captured in the image is identical to a specific object being preliminarily registered, by comparing the extracted feature amount with a feature amount of the specific object.

10. The image processing apparatus according to claim 9, wherein the object is a human body, and
wherein a person captured in the image is identified from among preliminarily registered persons by comparing the extracted feature amount with feature amounts of the preliminarily registered persons.

11. The image processing apparatus according to claim 10, wherein the feature amount is extracted of a partial image obtained by clipping the area determined from the image, based on a trained model for outputting a feature amount indicating each part of the object from an input image.

12. The image processing apparatus according to claim 10, wherein a feature amount is extracted from a partial area corresponding to the part of which the reliability of the first feature point is higher in a partial image obtained by clipping the area determined from the image.

13. The image processing apparatus according to claim 1, wherein the at least one processor is further configured to integrate the feature amount extracted from the image for each of the parts based on the reliability.

14. The image processing apparatus according to claim 1, wherein, in a case where a feature point is located outside a predetermined area, the reliability of the feature point is acquired in such a manner that the reliability is low.

15. The image processing apparatus according to claim 1, wherein an area including the object is determined based on a central axis of the object estimated based on the detected first feature points.

16. The image processing apparatus according to claim 1, wherein a rectangle including some of the first feature points is determined as the area including the object.

17. The image processing apparatus according to claim 1, wherein the at least one processor is further configured to output the first feature points detected and the second feature point detected in a distinguishable manner.

18. An image processing apparatus comprising:
   at least one memory storing instructions; and
   at least one processor that, upon execution of the stored instructions, are configured to:
   acquire a feature point indicating a position in an image of each of a plurality of parts of an object detected from the image, and a reliability indicating a likelihood that a part correspond to the feature point;
   extract a first image feature from the image for each of the parts indicated by the feature points;
   output a second image feature indicating a feature amount specific to the object based on the reliability and the first image feature; and
   identify the object detected from the image and a preliminarily registered predetermined object based on a feature amount indicating the preliminarily registered predetermined object and the second feature amount.

19. An image processing method comprising:
   detecting, as a first detection, from an image in which an object including a plurality of parts is captured, first feature points corresponding to the parts of the object;
   acquiring a reliability indicating a likelihood that a position indicated by a feature point is a part corresponding to the feature point for each of the first feature points detected in the first detection;
   detecting, as a second detection, a second feature point based on some of the first feature points for a part corresponding to the first feature point with the low reliability; and
   determining an area including the object based on some of the first feature points and the second feature point.

20. A non-transitory computer-readable storage medium storing a program for causing a computer to execute an image processing method, the image processing method comprising:
   detecting, as a first detection, from an image in which an object including a plurality of parts is captured, first feature points corresponding to the parts of the object;
   acquiring a reliability indicating a likelihood that a position indicated by a feature point is a part corresponding to the feature point for each of the first feature points detected in the first detection;
   detecting, as a second detection, a second feature point based on some of the first feature points for a part corresponding to the first feature point with the low reliability; and
   determining an area including the object based on some of the first feature points and the second feature point.

* * * * *